United States Patent
Sha et al.

(10) Patent No.: US 12,489,539 B2
(45) Date of Patent: Dec. 2, 2025

(54) MESSAGE SENDING METHODS AND DEVICES, AND TARGET CELL SELECTING METHODS AND DEVICES

(71) Applicant: ZTE CORPORATION, Guangdong (CN)

(72) Inventors: Xiubin Sha, Guangdong (CN); Bo Dai, Guangdong (CN); Shuqiang Xia, Guangdong (CN); Ting Lu, Guangdong (CN); Xu Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 668 days.

(21) Appl. No.: 17/599,037

(22) PCT Filed: Mar. 30, 2020

(86) PCT No.: PCT/CN2020/082026
§ 371 (c)(1),
(2) Date: Sep. 28, 2021

(87) PCT Pub. No.: WO2020/192784
PCT Pub. Date: Oct. 1, 2020

(65) Prior Publication Data
US 2022/0182165 A1    Jun. 9, 2022

(30) Foreign Application Priority Data
Mar. 28, 2019    (CN) .......................... 201910245666.6

(51) Int. Cl.
*H04J 3/06*    (2006.01)
*H04W 56/00*    (2009.01)
(Continued)

(52) U.S. Cl.
CPC .......... *H04J 3/0685* (2013.01); *H04W 56/001* (2013.01); *H04W 68/005* (2013.01); *H04W 76/30* (2018.02)

(58) Field of Classification Search
CPC . H04J 3/0685; H04W 56/001; H04W 68/005; H04W 76/30; H04W 48/12;
(Continued)

(56) References Cited

U.S. PATENT DOCUMENTS

2014/0106806 A1    4/2014    Frenger et al.
2014/0126472 A1*   5/2014    Siomina ................ H04W 56/00
                                                        370/328
(Continued)

FOREIGN PATENT DOCUMENTS

CN    101667909 A    3/2010
CN    102223197 A    10/2011
(Continued)

OTHER PUBLICATIONS

WIPO, International Search Report issued on Jun. 18, 2020.
(Continued)

*Primary Examiner* — Kwang B Yao
*Assistant Examiner* — Syed M Bokhari
(74) *Attorney, Agent, or Firm* — Li & Cai Intellectual Property (USA) Office

(57) ABSTRACT

The present disclosure provides message sending methods and devices, and target cell selecting methods and devices. One message sending method includes: sending a first message, which carries at least one of clock information and clock accuracy of a cell, to a User Equipment (UE), where the clock accuracy includes at least one of minimum granularity of clock synchronization, a total number of invalid bits
(Continued)

of clock synchronization cell, and indication information which indicates whether to support precise clock synchronization.

13 Claims, 16 Drawing Sheets

(51) Int. Cl.
*H04W 68/00* (2009.01)
*H04W 76/30* (2018.01)

(58) Field of Classification Search
CPC . H04W 48/16; H04W 48/20; H04W 56/0015; H04W 48/08; H04W 48/18; H04W 56/00
USPC .......................................................... 370/503
See application file for complete search history.

(56) References Cited

U.S. PATENT DOCUMENTS

| | | | | |
|---|---|---|---|---|
| 2015/0023188 | A1* | 1/2015 | Das | G01R 31/319 370/252 |
| 2016/0344442 | A1* | 11/2016 | Murai | H04B 1/7073 |
| 2016/0345281 | A1* | 11/2016 | Murray | H04W 56/0015 |
| 2017/0201958 | A1* | 7/2017 | He | H04W 56/0045 |
| 2018/0279186 | A1 | 9/2018 | Park et al. | |
| 2019/0116568 | A1* | 4/2019 | Fertonani | H04W 56/00 |
| 2019/0239172 | A1* | 8/2019 | Hampel | H04W 56/0065 |
| 2020/0145940 | A1* | 5/2020 | Gage | H04W 36/04 |
| 2021/0058181 | A1* | 2/2021 | Dwivedi | H04J 3/0667 |
| 2022/0124654 | A1* | 4/2022 | Takeda | H04W 72/121 |

FOREIGN PATENT DOCUMENTS

| | | |
|---|---|---|
| CN | 106792948 A | 5/2017 |
| CN | 108934059 A | 12/2018 |
| CN | 110536376 A | 12/2019 |
| KR | 20190029516 A | 3/2019 |
| WO | WO2017147787 A1 | 9/2017 |
| WO | WO2018028636 A1 | 2/2018 |

OTHER PUBLICATIONS

Nokia, "NR support for TSN traffic patterns" 3GPP TSG-RAN WG2 Meeting #104, dated Nov. 16, 2018.
Korean Patent Office, Office Action dated May 31, 2023, for corresponding KR application No. 10-2021-7035102.
CMCC, "Support for Accurate Reference Timing Delivery", 3GPP TSG RAN WG3#102, R3-186625, 3GPP, dated Nov. 3, 2018.
Huawei et al., "Introduction of providing sufficiently granular time reference information", 3GPP TSG RAN WG2 #102, R2-1809053, dated May 25, 2018.
European Patent Office, Eesr dated Nov. 14, 2022, for corresponding EP application No. 20778605.4.
Huawei, et al., "Introduction of providing sufficiently granular time reference information", 3GPP Draft, dated May 25, 2018.
"3rd Generation Partnership Project Technical Specification Group Radio Access Network", 3GPP Standard, Technical Report, dated Mar. 11, 2019.
CMCC, "Support for Accurate Reference Timing Delivery", 3GPP Draft, dated Nov. 3, 2018.
Vivo, "Discussion on the time synchronization within RAN for supporting IIOT", 3GPP Draft, dated Nov. 12, 2018.
ZTE Corporation, et al., "Other issues related to accurate reference timing delivery in TSC" , 3GPP Draft, dated Oct. 4, 2019.
"TSN synchronication requirements evaluation", 3GPP TSG-RAN WG2 Meeting #103, dated Oct. 12, 2018.
"TSN Time Synchronication Solutions Down-selection", 3GPP TSG-SA WG2 Meeting #131, dated Mar. 1, 2019.
China Patent Office, First office action dated Nov. 18, 2022, for corresponding CN application No. 201910245666.6.

\* cited by examiner

MESSAGE SENDING METHODS AND DEVICES, AND TARGET CELL SELECTING METHODS AND DEVICES

CROSS-REFERENCE TO RELATED APPLICATIONS

This is a National Phase Application filed under 35 U.S.C. 371 as a national stage of PCT/CN2020/082026, filed on Mar. 30, 2020, an application claiming the priority to the Chinese Patent Application No. 201910245666.6 filed with the CNIPA on Mar. 28, 2019, the entire contents of which are incorporated herein by reference.

TECHNICAL FIELD

The present disclosure relates to the field of communications, and in particular, to message sending methods and devices, and target cell selecting methods and devices.

BACKGROUND

In communication networks, some services are sensitive in delay and thus usually require a delay at microsecond level. Since transmission delay in a communication system is unavoidable, clocks of all communication devices in the communication system need to be synchronized in order to ensure delay accuracy of service transmission. The higher the delay accuracy of the service transmission, the higher the required clock synchronization accuracy, and the more the consumed radio resources. Therefore, a compromise is needed between clock accuracy and consumption of radio resources. Different cells vary in the clock accuracy that can be provided thereby. In order to satisfy a clock accuracy requirement of a service, a User Equipment (UE) should be able to acquire clock information or clock accuracy of a cell, so as to perform network selection according to the acquired information.

SUMMARY

In order to solve at least one of the above technical problems, embodiments of the present disclosure provide the following solutions.

An embodiment of the present disclosure provides a message sending method, including: sending a first message, which carries at least one of clock information and clock accuracy of a cell, to a UE, where the clock accuracy includes at least one of minimum granularity of clock synchronization, a total number of invalid bits of clock synchronization cell, and indication information which indicates whether to support precise clock synchronization.

An embodiment of the present disclosure provides a target cell selecting method, including: receiving a first message which carries at least one of clock information and clock accuracy of a cell, where the clock accuracy includes at least one of minimum granularity of clock synchronization, a total number of invalid bits of clock synchronization cell, and indication information which indicates whether to support precise clock synchronization; and selecting a target cell according to a clock accuracy requirement of a service and the content carried in the first message.

An embodiment of the present disclosure provides the other message sending method, including: acquiring a clock accuracy requirement of a service; determining information about a cell range to be measured by a UE according to clock accuracy of a cell and the clock accuracy requirement of the service; and sending a second message, which carries the information about the cell range to be measured by the UE or clock information of the cell, to the UE.

An embodiment of the present disclosure provides the other target cell selecting method, including: receiving a second message, which carries information about a cell range to be measured by a UE or clock information of a cell; and selecting a target cell according to the information about the cell range to be measured by the UE.

An embodiment of the present disclosure provides a message sending device, including: a first message sending module configured to send a first message, which carries at least one of clock information and clock accuracy of a cell, to a UE, where the clock accuracy includes at least one of minimum granularity of clock synchronization, a total number of invalid bits of clock synchronization cell, and indication information which indicates whether to support precise clock synchronization.

An embodiment of the present disclosure provides a target cell selecting device, including: a first message receiving module configured to receive a first message which carries at least one of clock information and clock accuracy of a cell, where the clock accuracy includes at least one of minimum granularity of clock synchronization, a total number of invalid bits of clock synchronization cell, and indication information which indicates whether to support precise clock synchronization; and a selection module configured to select a target cell according to a clock accuracy requirement of a service and the content carried in the first message.

An embodiment of the present disclosure provides the other message sending device, including: a second accuracy requirement acquisition module configured to acquire a clock accuracy requirement of a service; a range determining module configured to determine information about a cell range to be measured by a UE according to clock accuracy of a cell and the clock accuracy requirement of the service; and a second message sending module configured to send a second message, which carries the information about the cell range to be measured by the UE or clock information of the cell, to the UE.

An embodiment of the present disclosure provides the other target cell selecting device, including: a second message receiving module configured to receive a second message, which carries information about a cell range to be measured by a UE or clock information of a cell; and a selection module configured to select a target cell according to the information about the cell range to be measured by the UE.

An embodiment of the present disclosure provides a base station, including: a processor and a memory; where the memory is configured to store instructions; and the processor is configured to read the instructions to implement any one message sending method according to the embodiments of the present disclosure.

An embodiment of the present disclosure provides a UE, including: a processor and a memory; where the memory is configured to store instructions; and the processor is configured to read the instructions to implement any one target cell selecting method according to the embodiments of the present disclosure.

An embodiment of the present disclosure provides a communication system, including the base station and the UE provided by the embodiments of the present disclosure.

An embodiment of the present disclosure provides a storage medium having a computer program stored therein. When the computer program is executed by a processor, the message sending methods or the target cell selecting methods provided by the embodiments of the present disclosure are implemented.

With the message sending methods provided by the embodiments of the present disclosure, at least one of the clock information and the clock accuracy of the cell is sent to the UE, so that the UE can easily perform network selection according to the received information. Moreover, with the target cell selecting methods provided by the embodiments of the present disclosure, the target cell can be selected according to the clock accuracy requirement of the service and the clock information or the clock accuracy received, so as to achieve network selection.

DETAILED DESCRIPTION

In order to make the objectives, technical solutions and advantages of the present disclosure clearer, the embodiments of the present disclosure are described in detail below in conjunction with the accompanying drawings. It should be noted that the embodiments of the present disclosure and the features thereof can be arbitrarily combined with one another if no conflict is incurred.

Figure 1:
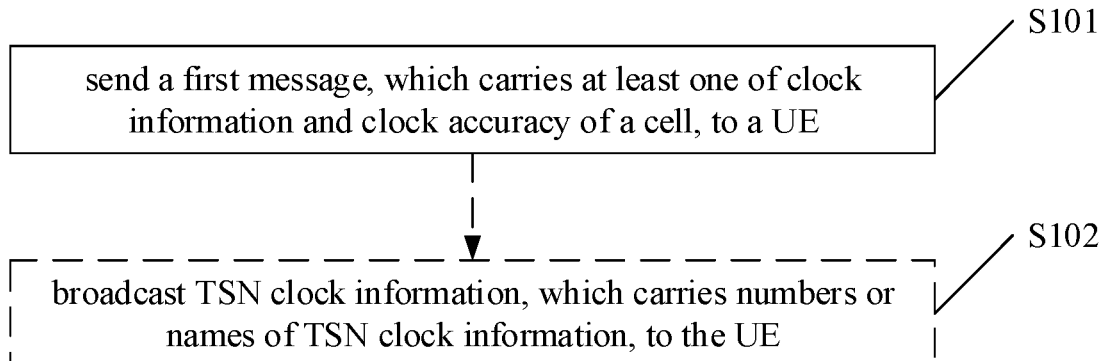
FIG. 1 is a flowchart illustrating a message sending method according to an embodiment of the present disclosure.

An embodiment of the present disclosure provides a message sending method. As shown in FIG. 1 which is a flowchart illustrating a message sending method according to an embodiment of the present disclosure, the method includes step S101.

At step S101, a first message, which carries at least one of clock information and clock accuracy of a cell, is sent to a UE. The cell includes at least one of a service cell and a neighboring cell.

The clock accuracy includes at least one of minimum granularity of clock synchronization, a total number of invalid bits of clock synchronization cell, and indication information which indicates whether to support precise clock synchronization.

By sending the clock information and the clock accuracy of the cell to the UE, the UE can acquire the information required for selecting a target cell, so that the UE can select a cell capable of satisfying a clock accuracy requirement of a service as the target cell according to the acquired information.

In an exemplary implementation, a precise clock value at nanosecond level can be obtained based on the clock information, such as a certain nanosecond at a certain second in a certain minute in a certain hour on a certain day in a certain month in a certain year.

In an exemplary implementation, the method may be applied to a base station.

In an exemplary implementation, the first message is a system broadcast message, UE dedicated signaling or a Paging message.

In an exemplary implementation, when the first message is the system broadcast message, the method further includes: sending a Paging message, which carries a clock accuracy requirement of a service, to the UE.

In an exemplary implementation, when the first message is the Paging message, the first message further carries the clock accuracy requirement of the service.

In an exemplary implementation, the method further includes: acquiring the clock accuracy requirement of the service, which includes at least one of a required clock accuracy value and an indication as to whether a precise clock is required.

In an exemplary implementation, the first message is an RRC connection reject message or an RRC connection release message.

The RRC connection reject message or the RRC connection release message further carries at least one of indication information for decreasing the UE from reselecting a current cell and validity duration of the indication information.

In an exemplary implementation, the indication information for decreasing the UE from reselecting the current cell is at least one of: an indication to decrease reselection priority of the current cell; an indication to add a reselection offset to the current cell; an indication to regard a state of the current cell as a block access state; and information about an RRC connection rejection cause.

The RRC connection rejection cause is that the clock accuracy cannot be satisfied or the Quality of Service (QoS) cannot be satisfied.

In an exemplary implementation, the first message is a message sent in a clock synchronization channel.

The clock synchronization channel is at least one of a physical channel for carrying the clock information, a Physical Downlink Shared Channel (PDSCH) based on predefined time-frequency resources, a PDSCH which configures time-frequency resources by means of Semi-Persistent Scheduling (SPS), dedicated resources preconfigured for the UE for transmitting the clock information, and a clock synchronization channel carried along as a data packet.

As shown in FIG. 1, the method further includes step S102.

At step S102, Time Sensitive Networking (TSN) clock information, which carries numbers or names of TSN clock information, is broadcasted to the UE.

Since the TSN clock information broadcasted by a base station carries the numbers or the names of the TSN clock information, the UE can select and acquire corresponding TSN clock information according to a number or a name of the TSN clock information required by the UE.

Figure 2:
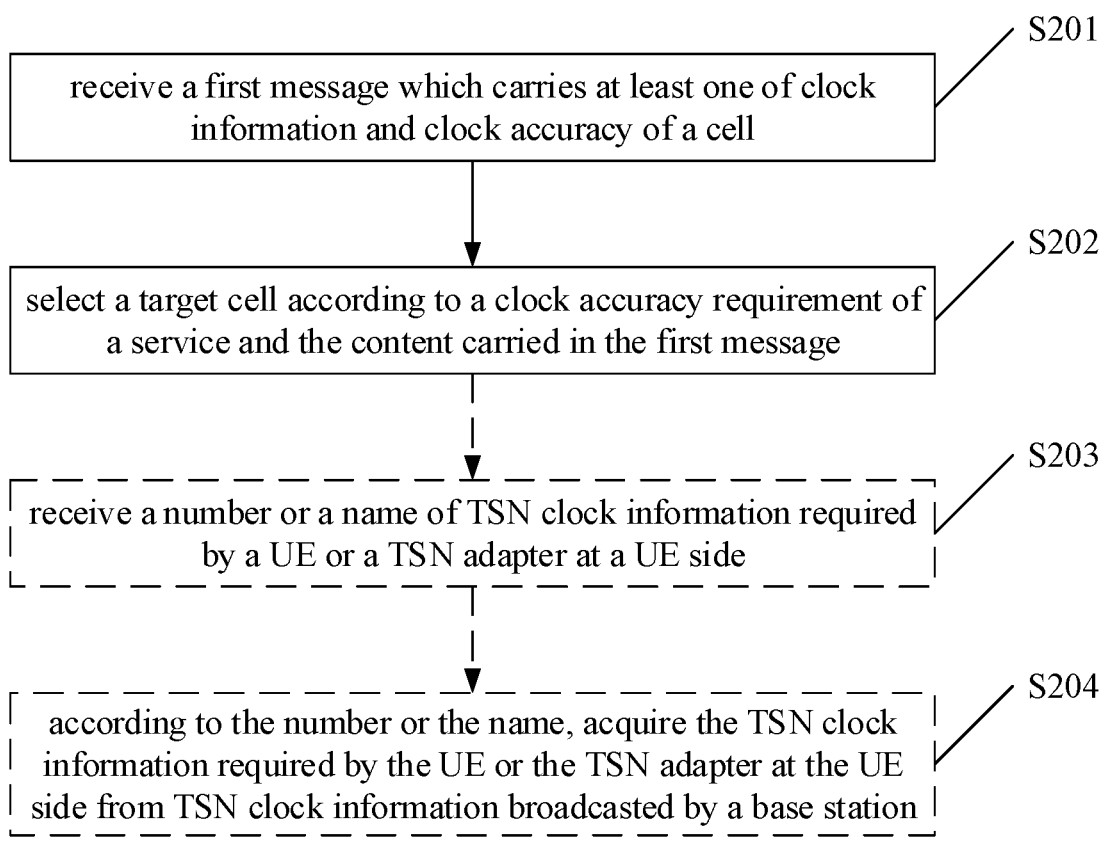
FIG. 2 is a flowchart illustrating a target cell selecting method according to an embodiment of the present disclosure.

An embodiment of the present disclosure provides a target cell selecting method. As shown in FIG. 2 which is a flowchart illustrating a target cell selecting method according to an embodiment of the present disclosure, the method includes steps S201 to S202.

At step S201, a first message which carries at least one of clock information and clock accuracy of a cell is received. The clock accuracy includes at least one of minimum granularity of clock synchronization, a total number of invalid bits of clock synchronization cell, and indication information which indicates whether to support precise clock synchronization.

At step S202, a target cell is selected according to a clock accuracy requirement of a service and the content carried in the first message.

The target cell selecting method provided by the embodiment of the present disclosure may be applied to a UE.

In an exemplary implementation, step S202 includes: regarding a cell as being in a block access state in response to a case where clock information of the cell cannot be acquired or clock accuracy of the cell cannot satisfy the clock accuracy requirement of the service; or decreasing reselection priority of a cell in response to a case where clock information of the cell cannot be acquired or clock accuracy of the cell cannot satisfy the clock accuracy requirement of the service.

Decreasing the reselection priority of the cell is that: decreasing absolute priority of the cell during a cell selection process or a cell reselection process, subtracting a positive reselection offset from a measured value of the cell, or adding a negative reselection offset to the measured value of the cell.

In an exemplary implementation, the clock accuracy requirement of the service includes at least one of a required clock accuracy value and an indication as to whether a precise clock is required.

As shown in FIG. 2, in an exemplary implementation, the target cell selecting method further includes steps S203 to S204.

At step S203, a number or a name of TSN clock information required by a UE or a TSN adapter at a UE side is received.

At step S204, the TSN clock information required by the UE or the TSN adapter at the UE side is acquired from TSN clock information broadcasted by a base station according to the number or the name.

In an exemplary implementation, step S203 includes: receiving a Non-Access Stratum (NAS) message or a service Packet Data Unit (PDU), which carries the number or the name.

The UE or the TSN adapter at the UE side can receive the number or the name of TSN clock information from a User Plane Function (UPF) or a TSN adapter at a UPF side.

The message sending method and the target cell selecting method provided by the embodiments of the present disclosure are illustrated in detail below by message interaction between a base station and a UE.

Embodiment One

Figure 3:
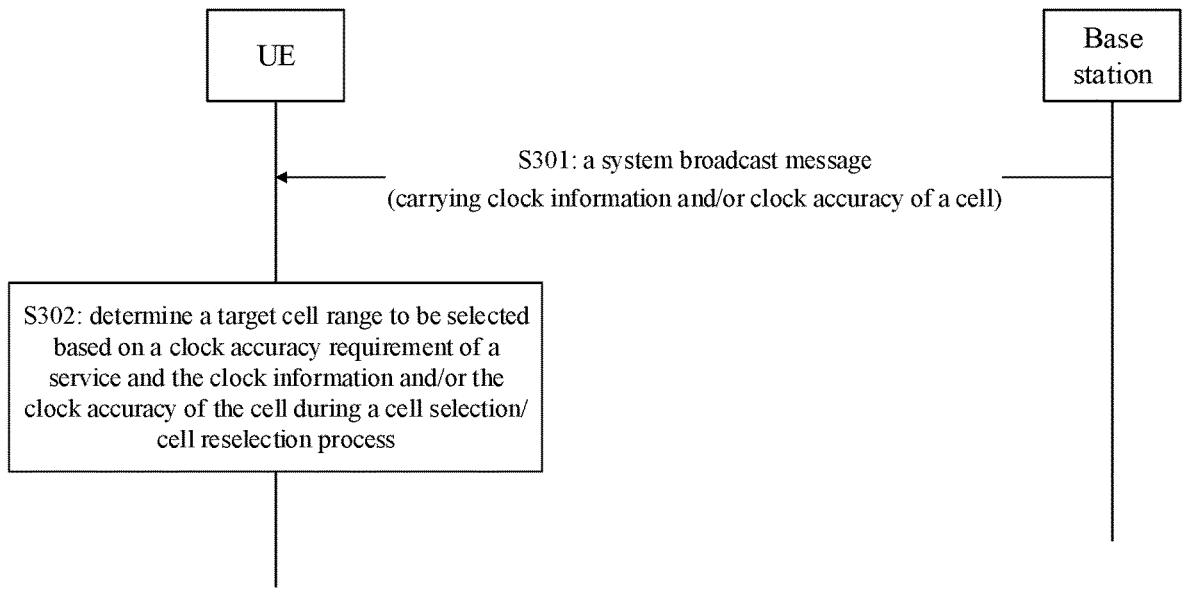
FIG. 3 is a flowchart of cell selection and reselection performed based on clock information and/or clock accuracy carried in a system broadcast message according to an embodiment of the present disclosure.

With reference to FIG. 3 which is a flowchart of cell selection and reselection performed based on clock information and/or clock accuracy carried in a system broadcast message according to an embodiment of the present disclosure, the flowchart includes steps S301 and S302.

At step S301, a base station carries clock information and/or clock accuracy of a cell in a system broadcast message and sends the system broadcast message.

Specifically, clock information and clock accuracy of a service cell are carried in a System Information Block Type 9 (SIB9) message, and clock accuracy of a neighboring cell is carried in an SIB3 message, an SIB4 message or an SIB5 message.

A precise clock value at nanosecond level can be obtained based on the clock information.

The clock accuracy information may be at least one of minimum granularity of clock synchronization, a total number of invalid bits of clock synchronization cell, and indication information which indicates whether to support precise clock synchronization.

At step S302, during a cell selection/cell reselection process, a UE determines a target cell range to be selected based on a clock accuracy requirement of a service and the information carried in the system broadcast message.

Specifically, during the cell selection and reselection process, for a service cell whose clock information cannot be acquired or a service cell whose clock accuracy cannot satisfy a clock accuracy requirement of a service carried by the UE, the UE regards the service cells as being in a block access state. In this way, the UE can exclude the service cells from candidate cells during the cell selection/cell reselection process, and will not initiate a service having an unsatisfied clock accuracy requirement in the service cells.

Alternatively, during the cell selection and reselection process, for a neighboring cell whose clock accuracy cannot satisfy a clock accuracy requirement of a service carried by the UE, the UE regards the neighboring cell as being in a block access state.

Figure 4:
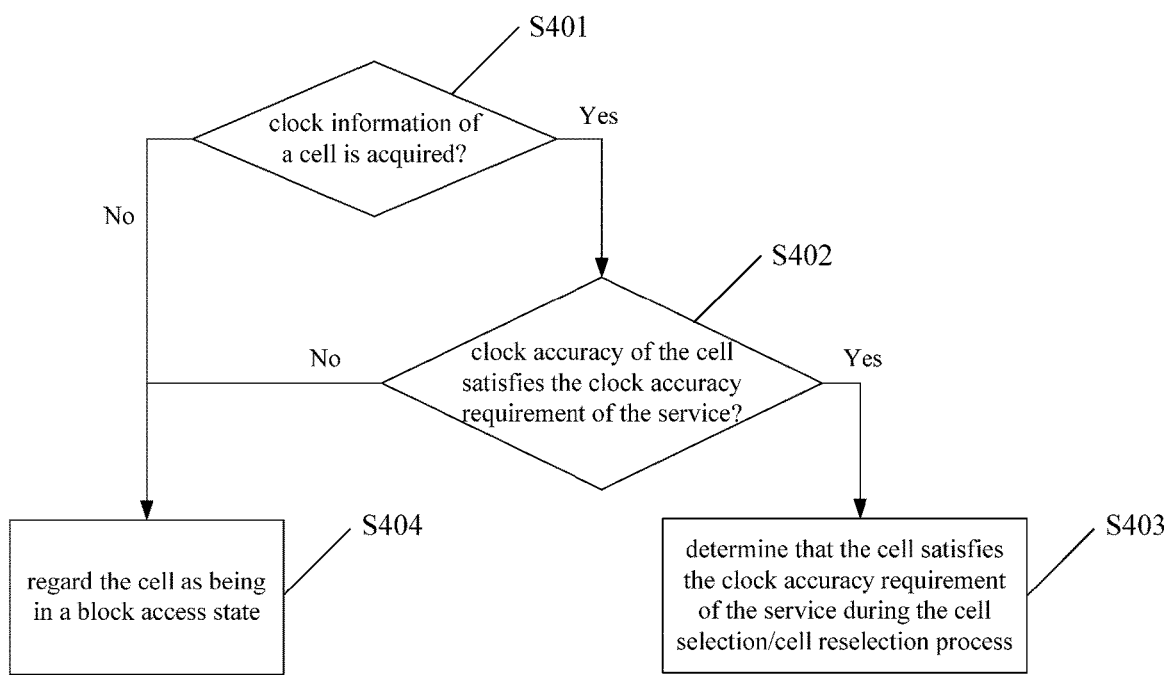
FIG. 4 is a flowchart illustrating a first way of determining a target cell range to be selected by a UE during a cell selection/cell reselection process according to an embodiment of the present disclosure.

FIG. 4 is a flowchart illustrating a first way of determining a target cell range to be selected by a UE during the cell selection/cell reselection process according to an embodiment of the present disclosure, and the flowchart includes steps S401 to S404.

At step S401, determining whether clock information of a cell is acquired, and if so, performing step S402; otherwise, performing step S404.

At step S402, determining whether clock accuracy of the cell satisfies the clock accuracy requirement of the service, and if so, performing step S403; otherwise, performing step S404.

At step S403, determining that the cell satisfies the clock accuracy requirement of the service during the cell selection/cell reselection process, and ending the current process.

At step S404, regarding the cell as being in a block access state.

Specifically, during the cell selection and reselection, for a service cell whose clock information cannot be acquired or a service cell whose clock accuracy cannot satisfy a clock accuracy requirement of a service carried by the UE, the UE decreases reselection priority of the service cell, so that the UE does not select the service cell to reside as much as possible.

Alternatively, during the cell selection and reselection process, for a neighboring cell whose clock accuracy cannot satisfy a clock accuracy requirement of a service carried by the UE, the UE decreases reselection priority of the neighboring cell, so that the UE does not select the neighboring cell as a target cell as much as possible.

Decreasing the reselection priority of the cell may be that: decreasing absolute priority of the cell during the cell selection and reselection process, and subtracting a positive reselection offset from a measured value of the cell or adding a negative reselection offset to the measured value of the cell in a cell reselection decision. The reselection offset may be a predefined standard value or a value configured by a base station for the UE.

Figure 5:
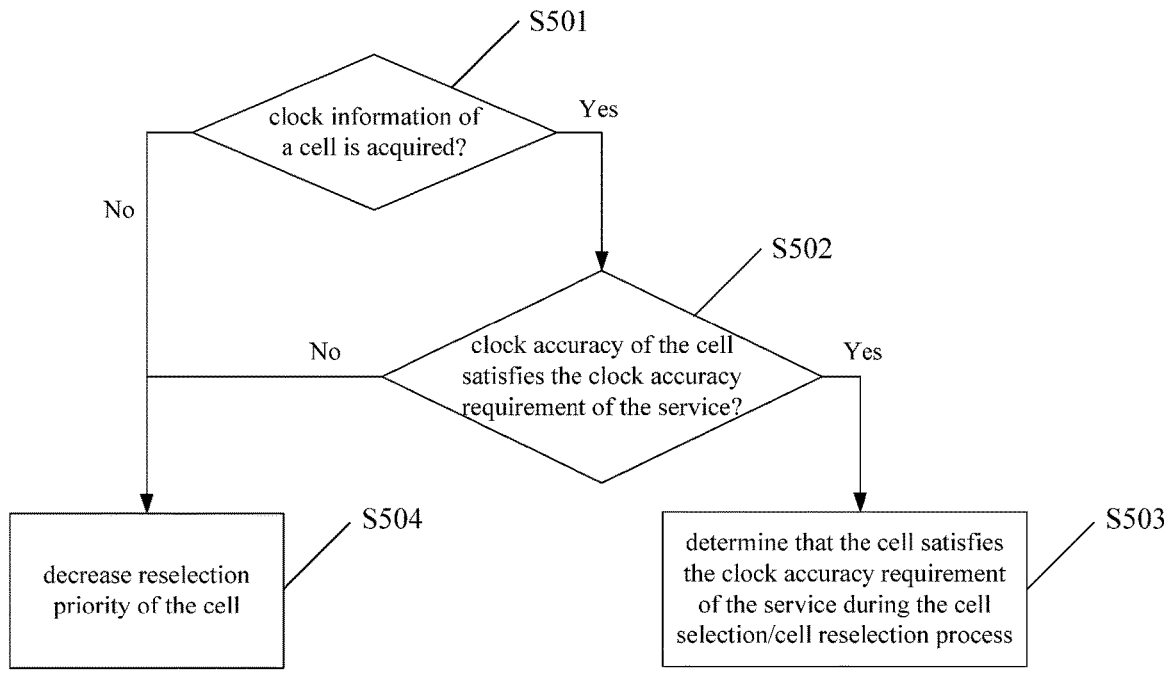
FIG. 5 is a flowchart illustrating a second way of determining a target cell range to be selected by a UE during a cell selection/cell reselection process according to an embodiment of the present disclosure.

FIG. 5 is a flowchart illustrating a second way of determining a target cell range to be selected by a UE during a cell selection/cell reselection process according to an embodiment of the present disclosure, and the flowchart includes steps S501 to S504.

At step S501, determining whether clock information of a cell is acquired, and if so, performing step S502; otherwise, performing step S504.

At step S502, determining whether clock accuracy of the cell satisfies the clock accuracy requirement of the service, and if so, performing step S503; otherwise, performing step S504.

At step S503, determining that the cell satisfies the clock accuracy requirement of the service during the cell selection/cell reselection process, and ending the current process.

At step S504, decreasing reselection priority of the cell.

Embodiment Two

Figure 6:
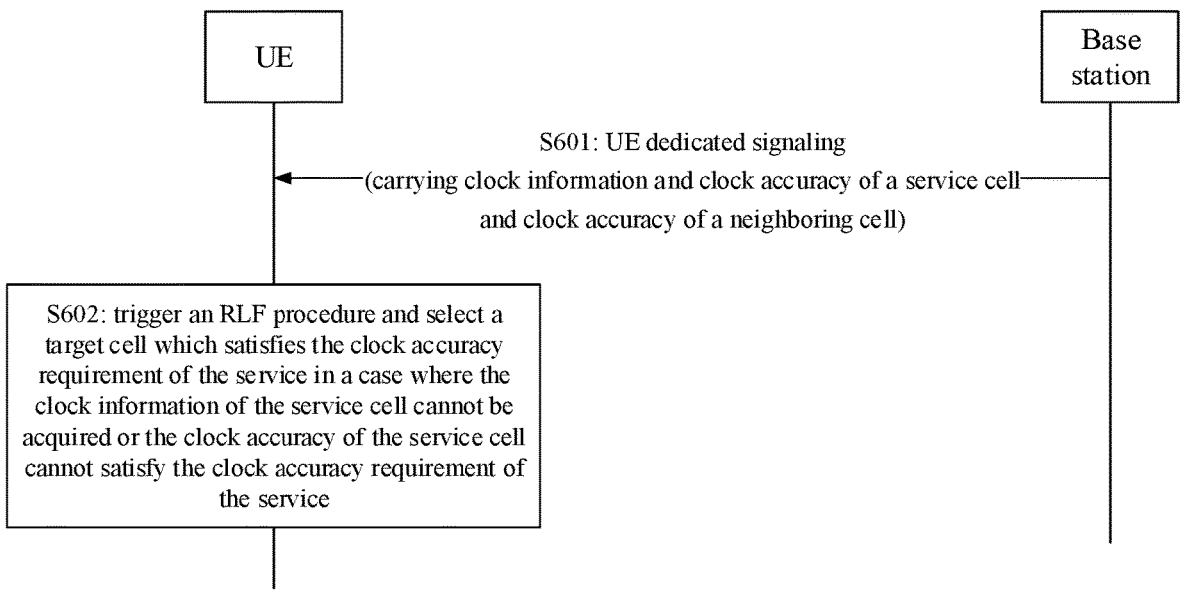
FIG. 6 is a flowchart of cell selection and reselection performed based on clock information and/or clock accuracy carried in UE dedicated signaling according to an embodiment of the present disclosure.

With reference to FIG. 6, which is a flowchart of cell selection and reselection performed based on clock information and/or clock accuracy carried in UE dedicated signaling according to an embodiment of the present disclosure, the flowchart includes steps S601 and S602.

At step S601, a base station carries at least one of clock information and clock accuracy of a service cell and clock accuracy of a neighboring cell in UE dedicated signaling, and sends the UE dedicated signaling.

At step S602, a UE receives the UE dedicated signaling. If the UE determines according to the UE dedicated signaling that the clock information of the service cell cannot be acquired or the clock accuracy of the service cell cannot satisfy a clock accuracy requirement of a service, the UE triggers a Radio Link Failure (RLF) procedure based on a case where the clock accuracy cannot satisfy the clock accuracy requirement of the service or the QoS cannot satisfy a requirement. Then the UE selects a neighboring cell which satisfies the clock accuracy requirement of the service as a target cell based on the clock accuracy requirement of the service and the clock accuracy of the neighboring cell, and initiates a service reestablishment procedure in the selected cell.

A way of selecting the target cell by the UE during the cell selection and reselection process after the RLF procedure is the same as that described in the Embodiment One, and thus is not repeated here.

Embodiment Three

Figure 7:
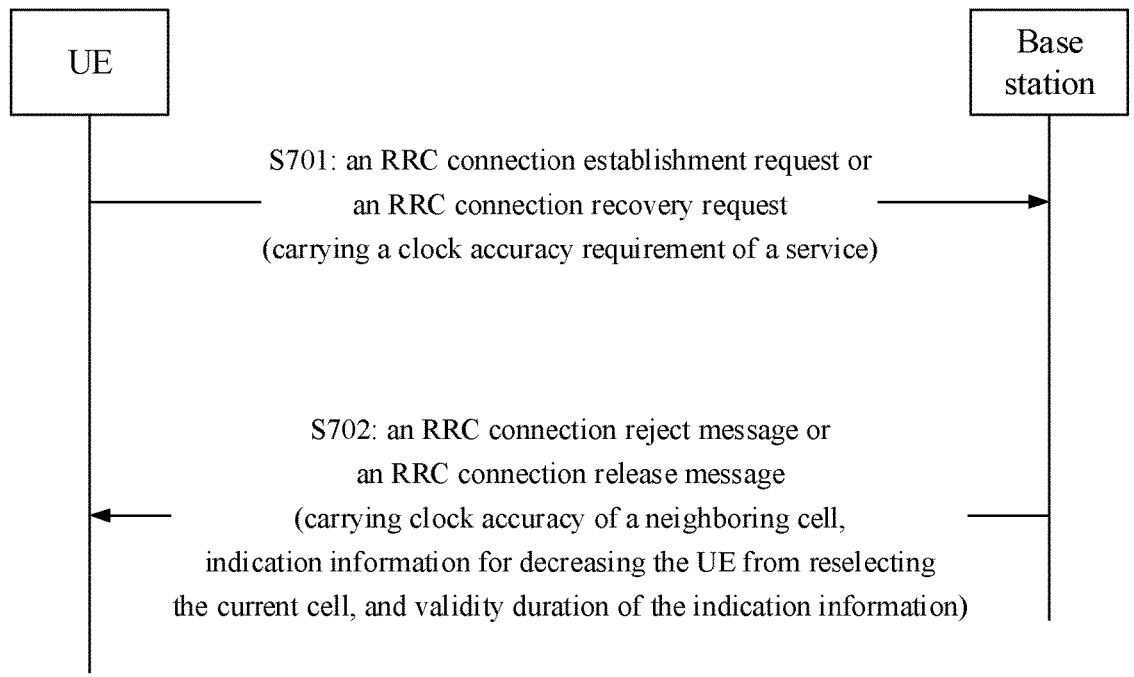
FIG. 7 is a flowchart illustrating a first way of performing cell selection and reselection based on clock information and/or clock accuracy carried in a Radio Resource Control (RRC) connection reject message or an RRC connection release message according to an embodiment of the present disclosure.

With reference to FIG. 7, which is a flowchart illustrating a first way of performing cell selection and reselection based on clock information and/or clock accuracy carried in an RRC connection reject message or an RRC connection release message according to an embodiment of the present disclosure, the flowchart includes steps S701 and S702.

At step S701, a UE sends an RRC connection establishment request or an RRC connection recovery request to a base station, and the RRC connection establishment request or the RRC connection recovery request carries a clock accuracy requirement of a service.

At step S702, the base station sends an RRC connection reject message or an RRC connection release message to the UE if the base station finds that clock accuracy of a current cell cannot satisfy the clock accuracy requirement of the service. The RRC connection reject message or the RRC connection release message includes at least one of clock accuracy of a neighboring cell, indication information for decreasing the UE from reselecting the current cell, and validity duration of the indication information.

The indication information for decreasing the UE from reselecting the current cell includes at least one of: an indication to decrease reselection priority of the current cell; an indication to add a reselection offset to the current cell; an indication to regard a state of the current cell as a block access state; and information about an RRC connection rejection cause.

The RRC connection rejection cause is that the clock accuracy cannot be satisfied or the QoS cannot be satisfied.

The indication information for decreasing the UE from reselecting the current cell is configured to prevent the UE from initiating a service having an unsatisfied requirement in the current cell later. Within the time indicated by the validity duration, the UE may select a target cell according to the clock accuracy of the neighboring cell in subsequent cell selection and/or service initiation process. A way of selecting the target cell is the same as that described in the Embodiment One, and thus is not repeated here.

Embodiment Four

Figure 8:
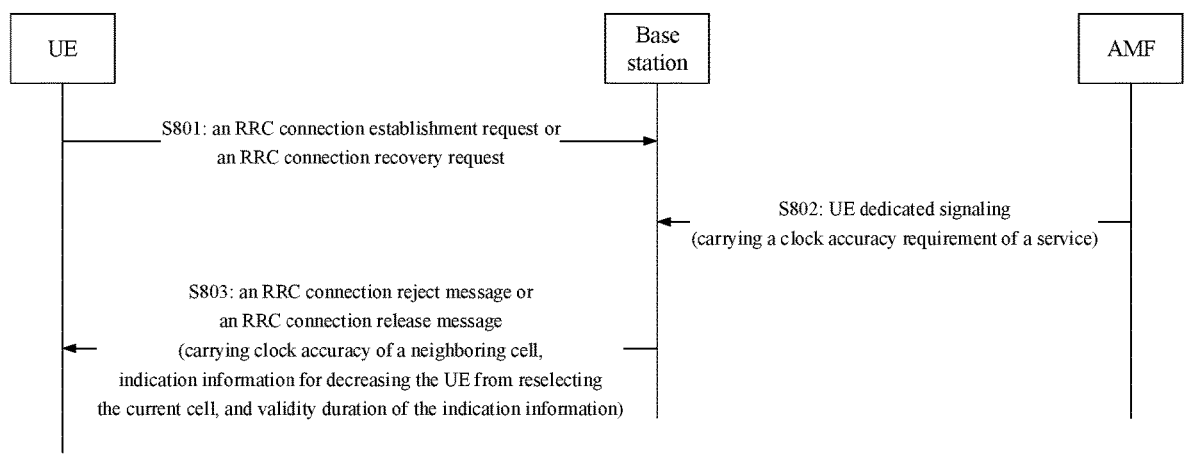
FIG. 8 is a flowchart illustrating a second way of performing cell selection and reselection based on clock information and/or clock accuracy carried in an RRC connection reject message or an RRC connection release message according to an embodiment of the present disclosure.

With reference to FIG. 8, which is a flowchart illustrating a second way of performing cell selection and reselection based on clock information and/or clock accuracy carried in an RRC connection reject message or an RRC connection release message according to an embodiment of the present disclosure, the flowchart includes steps S801 to S803.

At step S801, a UE sends an RRC connection establishment request or an RRC connection recovery request to a base station.

At step S802, the base station acquires a clock accuracy requirement of a service of the UE from an Access and Mobility Management Function (AMF) through UE dedicated signaling.

At step S803, the base station sends an RRC connection reject message or an RRC connection release message to the UE if the base station finds that clock accuracy of a current cell cannot satisfy the clock accuracy requirement of the service. The RRC connection reject message or the RRC connection release message includes at least one of clock accuracy of a neighboring cell, indication information for decreasing the UE from reselecting the current cell, and validity duration of the indication information. The content included in the indication information for decreasing the UE from reselecting the current cell is the same as that described in the Embodiment Three, and thus is not repeated here.

The indication information for decreasing the UE from reselecting the current cell is configured to prevent the UE from initiating a service having an unsatisfied requirement in the current cell later. Within the time indicated by the validity duration, the UE may select a target cell according to the clock accuracy of the neighboring cell in subsequent cell selection and/or service initiation process. A way of selecting the target cell is the same as that described in the Embodiment One, and thus is not repeated here.

Embodiment Five

Figure 9:
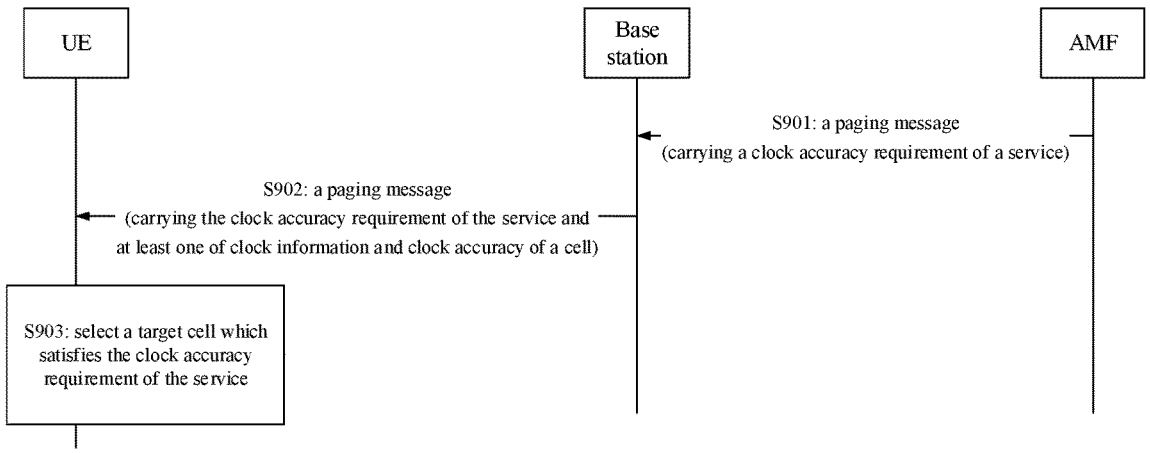
FIG. 9 is a flowchart illustrating a first way of target cell selection based on clock information and/or clock accuracy and triggered in a downlink service establishment procedure according to an embodiment of the present disclosure.

With reference to FIG. 9, which is a flowchart illustrating a first way of target cell selection based on clock information and/or clock accuracy and triggered in a downlink service establishment procedure according to an embodiment of the present disclosure, the flowchart includes steps S901 to S903.

At step S901, an AMF sends a Paging message, which carries a clock accuracy requirement of a service, to a base station through an Ng interface. The clock accuracy requirement of the service includes at least one of a required clock accuracy value (minimum granularity) and an indication as to whether a precise clock is required.

At step S902, the base station sends a Paging message to a UE through a Uu interface. The Paging message carries the clock accuracy requirement of the service and at least one of clock information and clock accuracy of a cell which includes at least one of a service cell and a neighboring cell.

At step S903, the UE selects a target cell which satisfies the clock accuracy requirement of the service according to the information carried in the Paging message to initiate the service.

A way of selecting the target cell by the UE is the same as that described in the Embodiment One, and thus is not repeated here.

Embodiment Six

Figure 10:
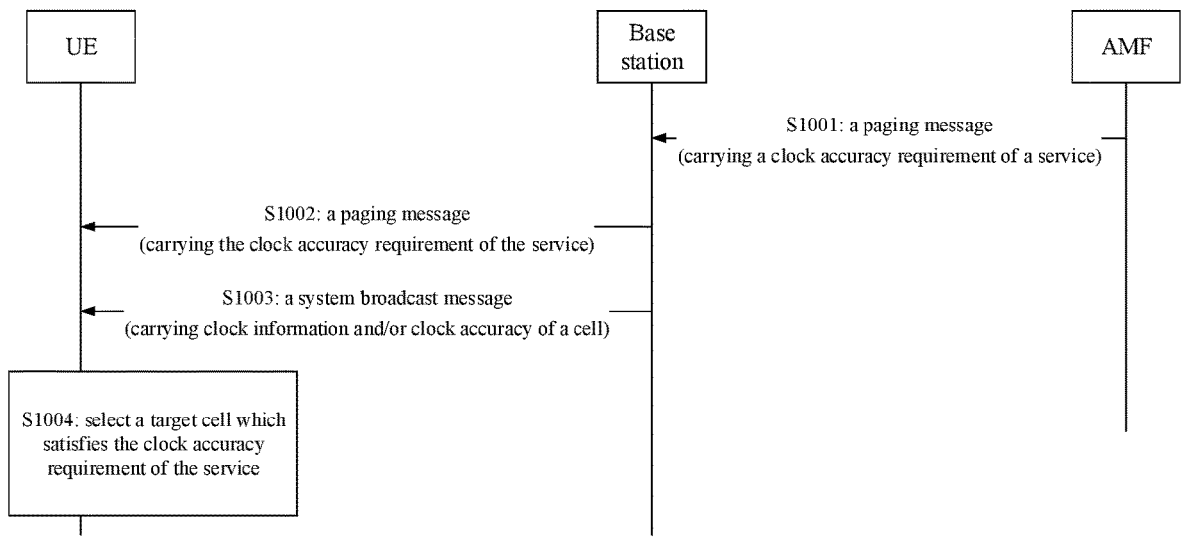
FIG. 10 is a flowchart illustrating a second way of target cell selection based on clock information and/or clock accuracy and triggered in a downlink service establishment procedure according to an embodiment of the present disclosure.

With reference to FIG. 10, which is a flowchart illustrating a second way of target cell selection based on clock information and/or clock accuracy and triggered in a downlink service establishment procedure according to an embodiment of the present disclosure, the flowchart includes steps S1001 to S1004.

At step S1001, an AMF sends a Paging message, which carries a clock accuracy requirement of a service, to a base station through an Ng interface. The clock accuracy requirement of the service includes at least one of a required clock accuracy value (minimum granularity) and an indication as to whether a precise clock is required.

At step S1002, the base station sends a Paging message to a UE through a Uu interface. The Paging message carries the clock accuracy requirement of the service and triggers the UE to select a target cell which satisfies the clock accuracy requirement of the service to initiate the service.

At step S1003, the base station carries clock information and/or clock accuracy of a cell in a system broadcast message, and sends the broadcast system message.

At step S1004, the UE selects the target cell based on the clock accuracy requirement of the service and the information carried in the system broadcast message to initiate the service.

Steps S1003 and S1004 are the same as the corresponding steps in the Embodiment One, and thus are not repeated here.

In an exemplary implementation, the base station sends the clock synchronization channel which carries the clock information and/or the clock accuracy to the UE at a fixed time interval in a fixed frequency resource position; correspondingly, the UE receives the information of the clock synchronization channel at the fixed time interval in the fixed frequency resource position, and acquires the clock information and/or the clock accuracy.

Figure 11:
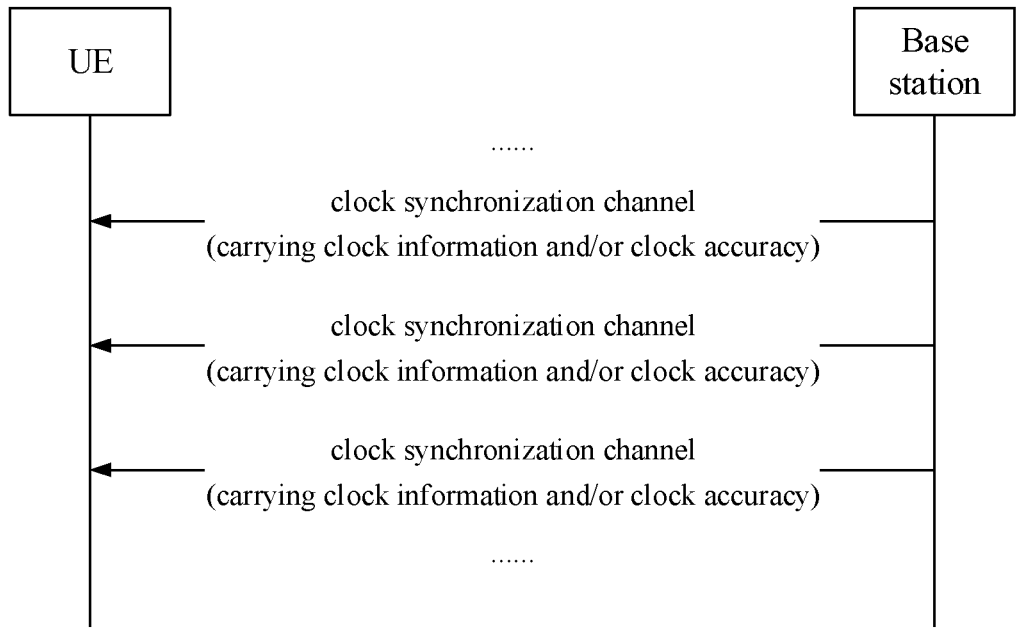
FIG. 11 is a schematic diagram of a process of sending clock information and/or clock accuracy by a base station in a clock synchronization channel according to an embodiment of the present disclosure.

FIG. 11 is a schematic diagram of a process of sending clock information and/or clock accuracy by a base station in a clock synchronization channel according to an embodiment of the present disclosure. In FIG. 11, the base station periodically sends the clock information and/or the clock accuracy in the clock synchronization channel.

The clock synchronization channel may be at least one of a newly designed physical channel for carrying the clock information or the clock accuracy, a PDSCH based on predefined time-frequency resources, a PDSCH which configures time-frequency resources by means of SPS, dedicated resources preconfigured for the UE for transmitting the clock information or the clock accuracy, and a clock synchronization channel carried along as a data packet. The common features of all those channels are fixed time-frequency resources, fixed periods, and no need for dynamic resource scheduling.

The PDSCH based on predefined time-frequency resources may be similar to channel transmission of Master Information Block (MIB) and SIB1, and the time/frequency resources and the transmission interval can be predefined by a protocol.

The PDSCH which configures time-frequency resources by means of SPS may be similar to SPS resource configuration in a connected mode, and the SPS resource configuration is carried in an SIB (such as an SIB1). The UE performs reception based on the time/frequency resources and the transmission interval of the clock synchronization channel configured in the SIB.

The dedicated resources preconfigured for the UE for transmitting the clock information or the clock accuracy may be UE-level dedicated resources preconfigured for the UE to receive clock information or clock accuracy of a cell in an idle mode or a connected mode.

The clock synchronization channel carried along as a data packet may have the clock information or the clock accuracy carried in one of the following messages: a Paging message, a Random Access Response (RAR), an RRC message 4 (RRC Msg 4), and a data PDU, and the clock information or the clock accuracy is transferred as downlink data information in data transmission in an initial stage of called signaling (such as Mobile Termination-Early Data Transmission (MT-EDT)).

According to the above embodiments, the base station sends the clock information or the clock accuracy of the service cell and the neighboring cell to the UE in different ways, so that the UE can select the target cell according to the clock accuracy requirement of the service and the received information.

Figure 12:
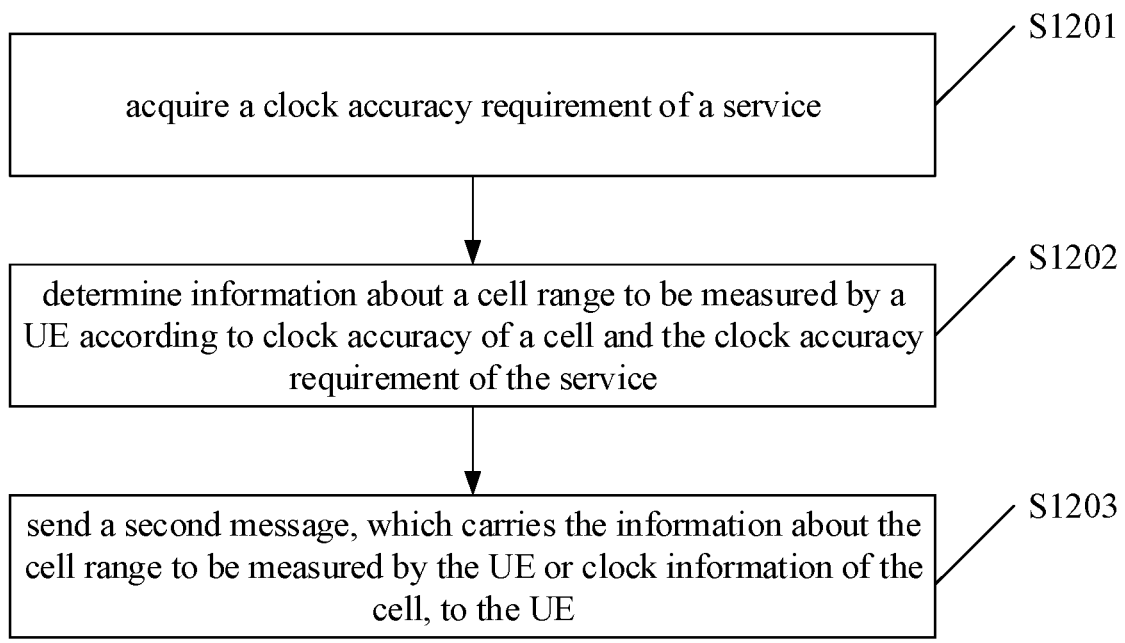
FIG. 12 is a flowchart illustrating the other message sending method according to an embodiment of the present disclosure.

An embodiment of the present disclosure further provides the other message sending method. As shown in FIG. 12 which is a flowchart illustrating the other message sending method according to an embodiment of the present disclosure, the method includes steps S1201 to S1203.

At step S1201, a clock accuracy requirement of a service is acquired.

At step S1202, information about a cell range to be measured by a UE is determined according to clock accuracy of a cell and the clock accuracy requirement of the service.

At step S1203, a second message, which carries the information about the cell range to be measured by the UE or clock information of the cell, is sent to the UE.

This embodiment of the present disclosure may be applied to a base station.

In an exemplary implementation, step S1201 includes: acquiring the clock accuracy requirement of the service through UE dedicated signaling, or receiving the clock accuracy requirement of the service reported by the UE. The base station may acquire the clock accuracy requirement of the service from an AMF through the UE dedicated signaling.

The clock accuracy requirement of the service includes at least one of a required clock accuracy value and an indication as to whether a precise clock is required.

In an exemplary implementation, the second message is a Paging message or UE dedicated signaling.

When the second message is the Paging message, the information about the cell range to be measured by the UE includes at least one of target cell information and an indication to reselect a target cell.

When the second message is UE dedicated signaling, the information about the cell range to be measured by the UE includes at least one of a blacklist of cells, a whitelist of cells, and a predetermined cell list which includes an identification of a neighboring cell that satisfies the clock accuracy requirement of the service.

Figure 13:
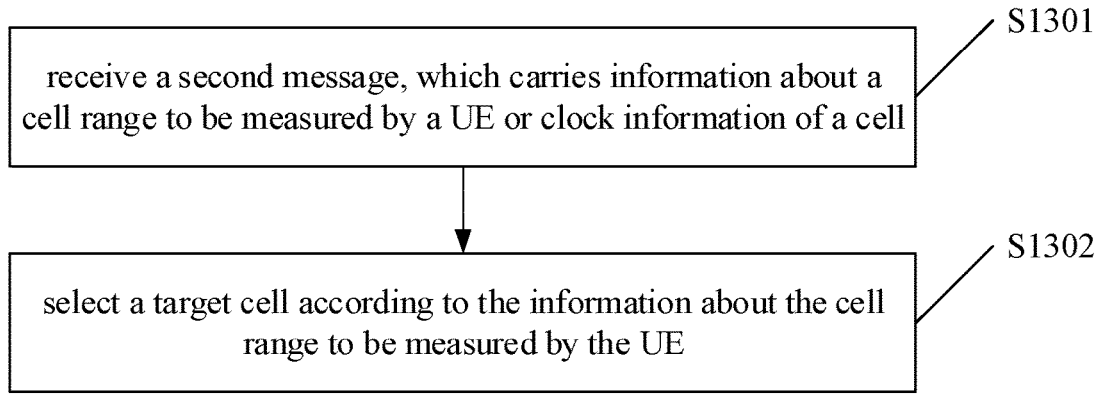
FIG. 13 is a flowchart illustrating the other target cell selecting method according to an embodiment of the present disclosure.

Correspondingly, an embodiment of the present disclosure provides the other target cell selecting method. As shown in FIG. 13 which is a flowchart illustrating the other target cell selecting method according to an embodiment of the present disclosure, the method includes steps S1301 to S1302.

At step S1301, a second message, which carries information about a cell range to be measured by a UE or clock information of a cell, is received.

At step S1302, a target cell is selected according to the information about the cell range to be measured by the UE.

This embodiment of the present disclosure may be applied to a UE.

In an exemplary implementation, before step S1301, the method further includes: sending a clock accuracy requirement of a service through UE dedicated signaling or a Media Access Control (MAC) Control Element (CE).

The clock accuracy requirement of the service includes at least one of a required clock accuracy value and an indication as to whether a precise clock is required.

The other message sending method and the other target cell selecting method provided by the embodiments of the present disclosure are illustrated in detail below by message interaction between a base station and a UE.

Embodiment Seven

Figure 14:
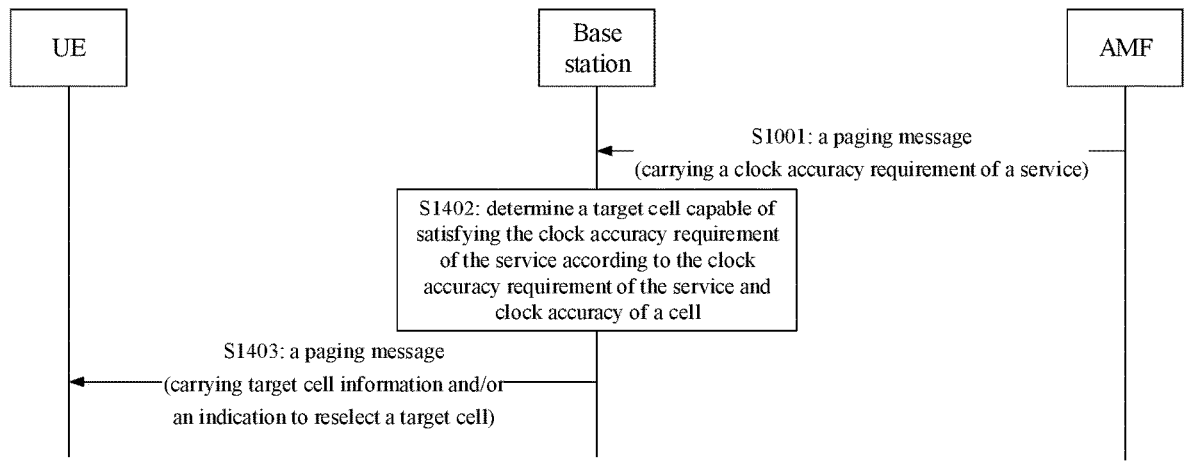
FIG. 14 is a flowchart illustrating a third way of target cell selection based on clock information and/or clock accuracy and triggered in a downlink service establishment procedure according to an embodiment of the present disclosure.

With reference to FIG. 14, which is a flowchart illustrating a third way of target cell selection based on clock information and/or clock accuracy and triggered in a downlink service establishment procedure according to an embodiment of the present disclosure, the flowchart includes steps S1401 to S1403.

At step S1401, an AMF sends a Paging message, which carries a clock accuracy requirement of a service, to a base station through an Ng interface. The clock accuracy requirement of the service includes at least one of a required clock accuracy value (minimum granularity) and an indication as to whether a precise clock is required.

At step S1402, the base station determines a cell capable of satisfying the clock accuracy requirement of the service according to the clock accuracy requirement of the service and clock accuracy of a cell, and selects the cell as a target cell. A way of selecting the target cell by the base station is selecting a cell as the target cell if clock accuracy of the cell can satisfy the clock accuracy requirement of the service.

At step S1403, the base station sends a Paging message to a UE through a Uu interface. The Paging message carries target cell information and/or an indication to reselect a target cell and triggers the UE to reselect the target cell and initiate the service in the target cell. The indication to reselect a target cell includes the target cell information.

In this embodiment, the information included in the target cell information and/or the indication to reselect a target cell may be considered as special information about the cell range to be measured by the UE. Only one target cell is included in such range to be measured.

Embodiment Eight

Figure 15:
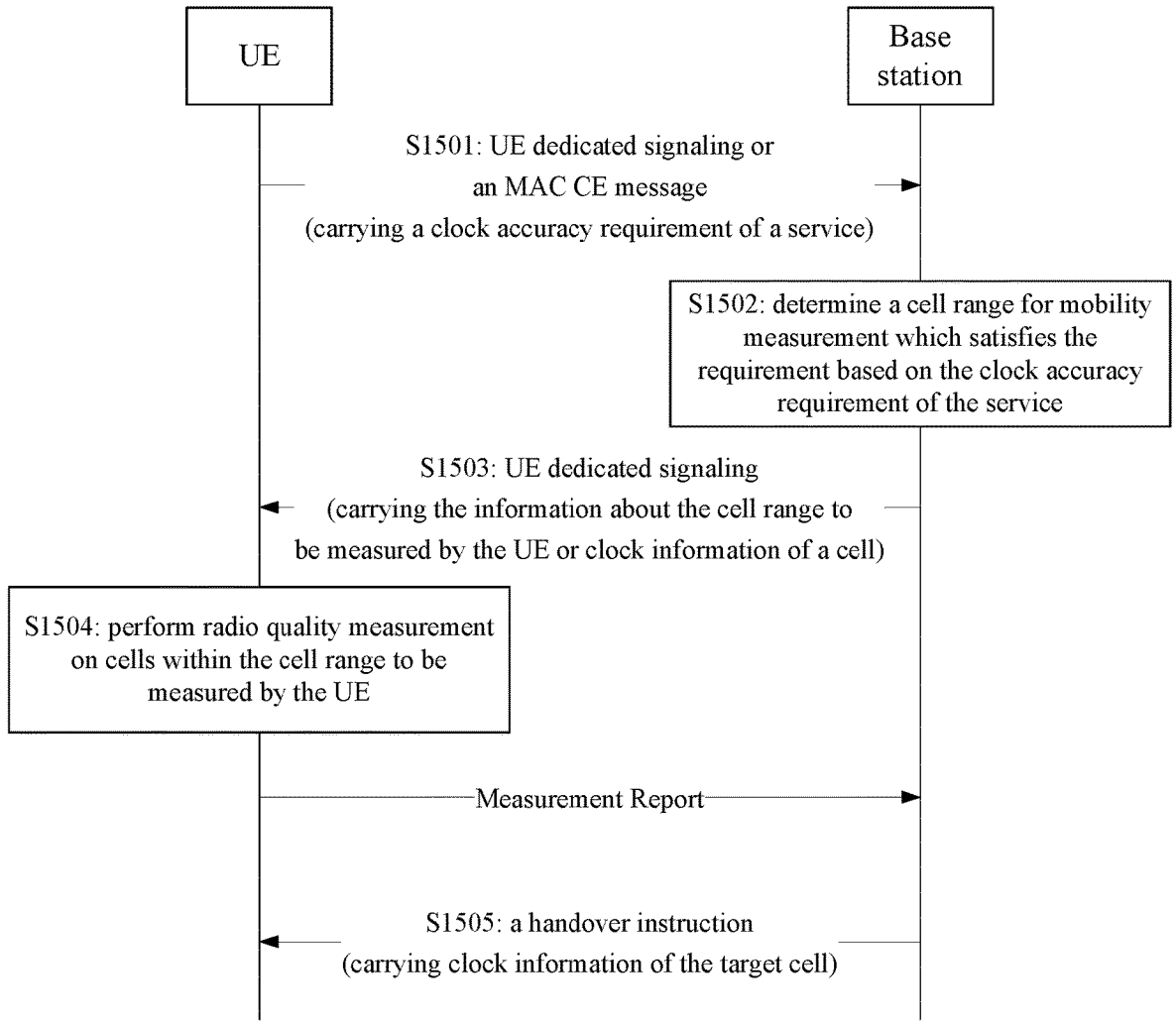
FIG. 15 is a flowchart illustrating a first way of target cell selection in a connected mode based on clock information and/or clock accuracy according to an embodiment of the present disclosure.

With reference to FIG. 15, which is a flowchart illustrating a first way of target cell selection in a connected mode based on clock information and/or clock accuracy according to an embodiment of the present disclosure, the flowchart includes steps S1501 to S1505.

At step S1501, a UE reports UE dedicated signaling or an MAC CE message to a base station when a service is established or updated, and the UE dedicated signaling or the MAC CE message carries a clock accuracy requirement of the service.

The UE reports the clock accuracy requirement of the service through an RRC message when the service is established. For example, the clock accuracy requirement of the service is carried in an RRC Msg3, an RRC Msg5 or UE Capability information, or the clock accuracy requirement of the service is carried in UE auxiliary information as service feature information. Alternatively, the UE reports the clock accuracy requirement of the service through an MAC CE when the service is established and/or updated.

The clock accuracy requirement of the service may include at least one of a required clock accuracy value (minimum granularity) and an indication as to whether a precise clock is required.

At step S1502, the base station determines a cell range for mobility measurement which satisfies the clock accuracy requirement of the service, so as to prevent the UE from measuring, selecting and reporting a target cell which does not satisfy the clock accuracy requirement of the service.

At step S1503, the base station configures information about a cell range to be measured by the UE or clock information of a cell for the UE through UE dedicated signaling. The UE dedicated signaling carries Measurement Configuration information, which includes the information about the cell range to be measured by the UE. The information about the cell range to be measured by the UE may include at least one of a blacklist of cells, a whitelist of cells, and a predetermined cell list which includes an identification of a neighboring cell which satisfies the clock accuracy requirement of the service. The clock information of the cell carried in the UE dedicated signaling is used by the UE to obtain a clock value of the cell.

The blacklist of cells may contain information about a cell which does not satisfy the clock accuracy requirement of the service; the whitelist of cells may contain information about a cell which satisfies the clock accuracy requirement of the service, and clock accuracy of the cell; and the predetermined cell list may be a separate cell list and contains the information about the cell which satisfies the clock accuracy requirement of the service.

At step S1504, the UE performs radio quality measurement on cells within the cell range to be measured by the UE based on the information about the cell range to be measured by the UE carried in the Measurement Configuration information, and sends a Measurement Report to the base station.

At step S1505, the base station selects a target cell according to the information in the Measurement Report and sends a handover instruction, which carries clock information of the target cell, to the UE.

Embodiment Nine

Figure 16:
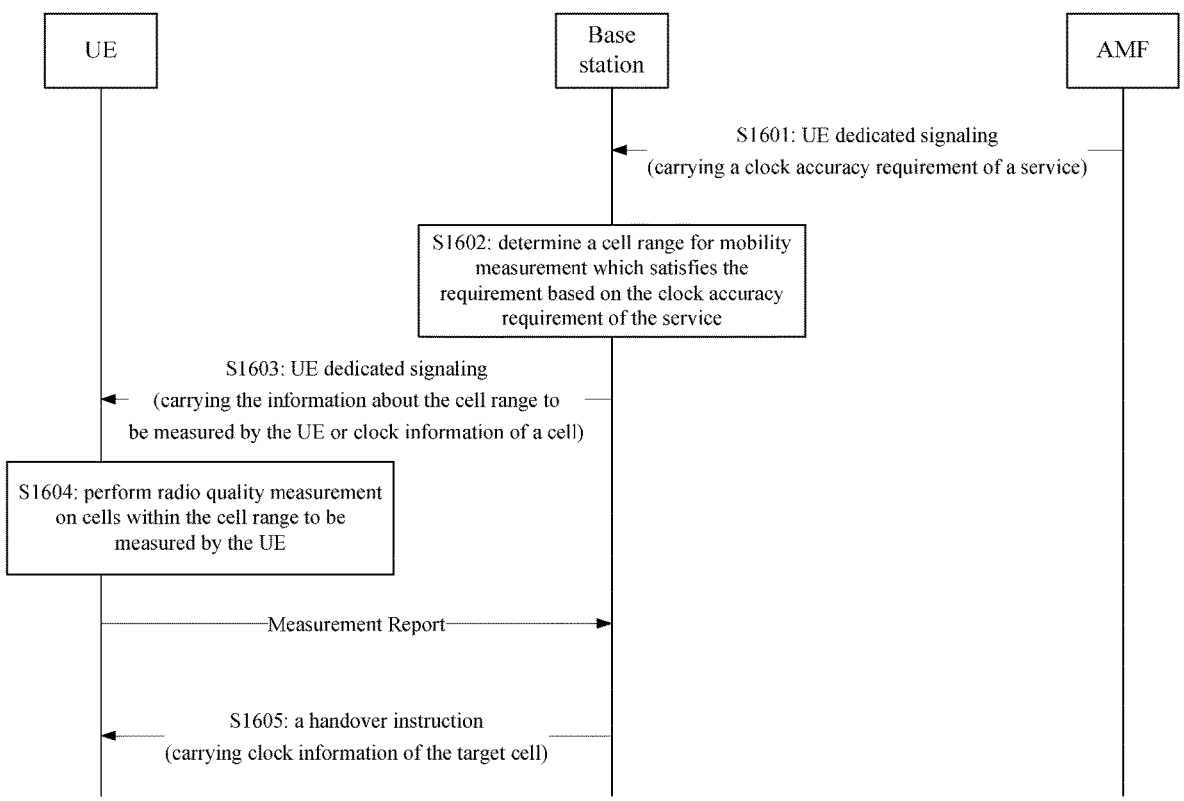
FIG. 16 is a flowchart illustrating a second way of target cell selection in a connected mode based on clock information and/or clock accuracy according to an embodiment of the present disclosure.

With reference to FIG. 16, which is a flowchart illustrating a second way of target cell selection in a connected mode based on clock information and/or clock accuracy according to an embodiment of the present disclosure, the flowchart includes steps S1601 to S1605.

At step S1601, an AMF sends UE dedicated signaling to a base station through an Ng interface, so as to send a clock accuracy requirement of a service to the base station as service feature information or QoS parameter information.

The clock accuracy requirement of the service may include at least one of a required clock accuracy value (minimum granularity) and an indication as to whether a precise clock is required.

At step S1602, the base station determines a cell range for mobility measurement which satisfies the clock accuracy requirement of the service, so as to prevent a UE from measuring, selecting and reporting a target cell which does not satisfy the clock accuracy requirement of the service At step S1603, the base station feeds back information about a cell range to be measured by a UE or clock information of a cell to the UE through UE dedicated signaling. The UE dedicated signaling carries Measurement Configuration information, which includes the information about the cell range to be measured by the UE. The content included in the information about the cell range to be measured by the UE is the same as that described in the above embodiment, and thus is not repeated here. The clock information of the cell carried in the UE dedicated signaling is used by the UE to obtain a clock value of the cell.

At step S1604, the UE performs radio quality measurement on cells within the cell range to be measured by the UE based on the information about the cell range to be measured by the UE carried in the Measurement Configuration information, and sends a Measurement Report to the base station.

At step S1605, the base station selects a target cell according to the information in the Measurement Report and sends a handover instruction, which carries clock information of the target cell, to the UE.

In the above embodiments, the base station selects a target cell range which can satisfy the clock accuracy requirement of the service for the UE, and notifies the UE of the target cell range. The UE performs measurement on the target cell range and reports the radio quality, so that the UE can select the target cell which satisfies the clock accuracy requirement of the service.

The specific embodiments of network selection are described above. The embodiments described below are specific embodiments of broadcasting TSN clock information by a base station and receiving the TSN clock information by a UE or a TSN adapter at a UE side.

Embodiment Ten

Figure 17:
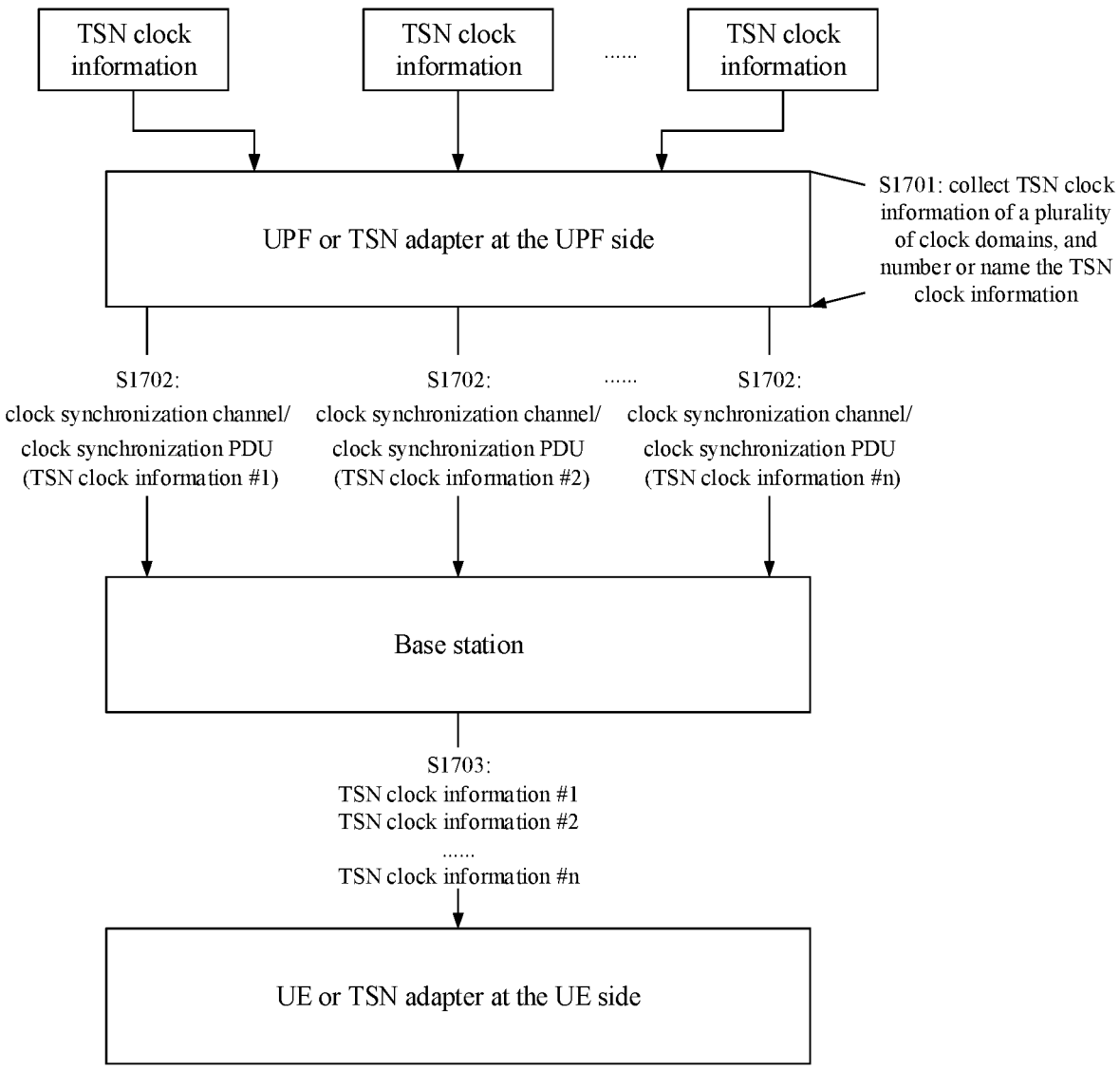
FIG. 17 is a flowchart illustrating a first way of broadcasting TSN clock information by a base station according to an embodiment of the present disclosure.

FIG. 17 is a flowchart illustrating a first way of broadcasting TSN clock information by a base station according to an embodiment of the present disclosure, the flowchart includes steps S1701 to S1703.

At step S1701, a UPF or a TSN adapter at a UPF side collects TSN clock information of a plurality of clock domains, and numbers or names the TSN clock information to obtain a number or a name of each piece of TSN clock information.

At step S1702, the UPF or the TSN adapter at the UPF side sends the TSN clock information to a base station through a clock synchronization channel or a clock synchronization PDU. Each piece of TSN clock information includes at least one of the number of the TSN clock information, the name of the TSN clock information, an indication of a type of a data packet carrying clock transfer, and a start timestamp of transmission. In this embodiment, one clock synchronization channel or one clock synchronization PDU carries one piece of TSN clock information.

At step S1703, the base station broadcasts the received TSN clock information to a UE.

Thus, the UE can select required TSN clock information from the information broadcasted by the base station according to a number or a name of the required TSN clock information.

Embodiment Eleven

Figure 18:
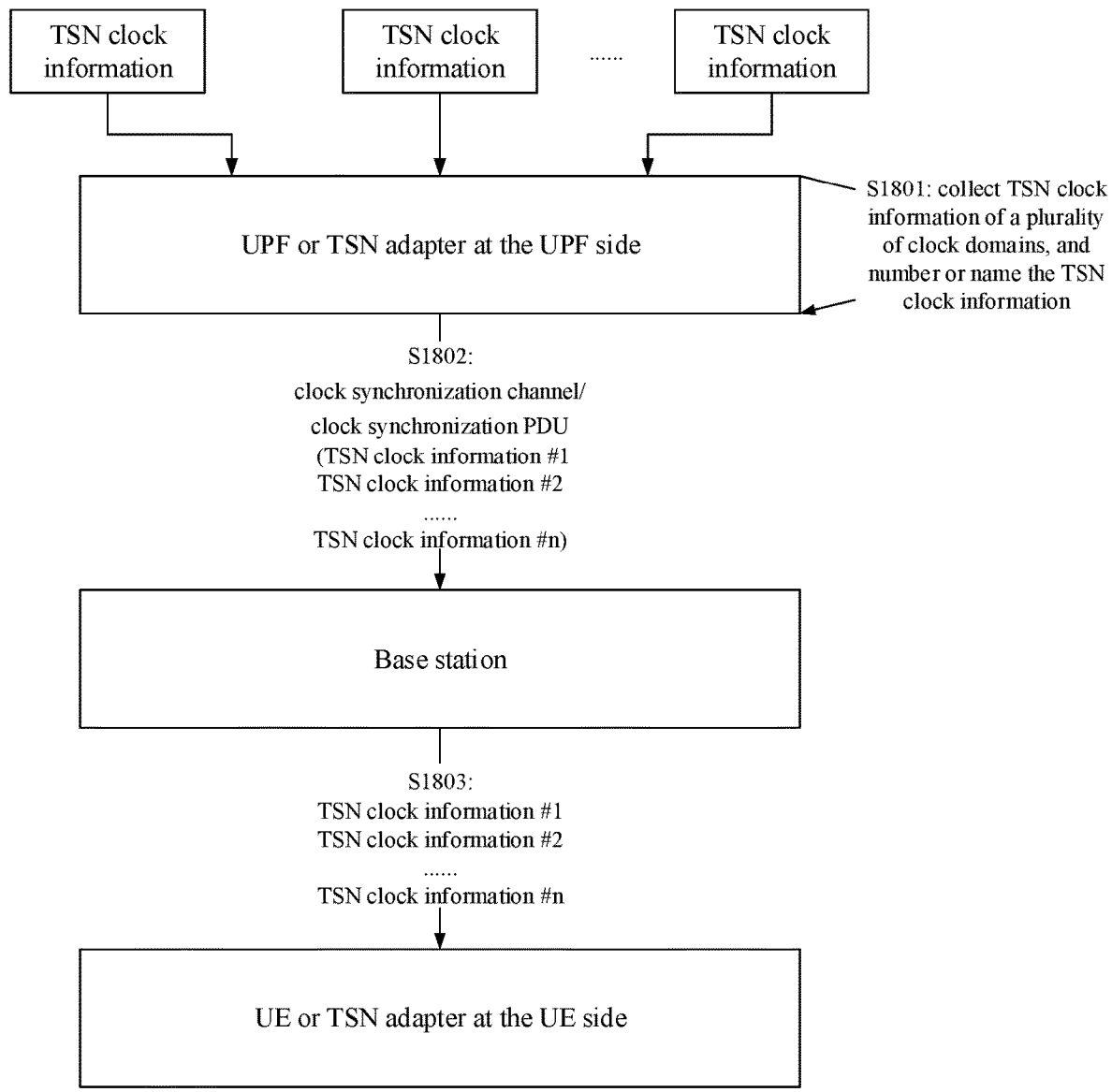
FIG. 18 is a flowchart illustrating a second way of broadcasting TSN clock information by a base station according to an embodiment of the present disclosure.

FIG. 18 is a flowchart illustrating a second way of broadcasting TSN clock information by a base station according to an embodiment of the present disclosure, the flowchart includes steps S1801 to S1803.

At step S1801, a UPF or a TSN adapter at a UPF side collects TSN clock information of a plurality of clock domains, and numbers or names the TSN clock information to obtain a number or a name of each piece of TSN clock information.

At step S1802, the UPF or the TSN adapter at the UPF side sends the TSN clock information to a base station through a clock synchronization channel or a clock synchronization PDU. Each piece of TSN clock information includes at least one of the number of the TSN clock information, the name of the TSN clock information, an indication of a type of a data packet carrying clock transfer, and a start timestamp of transmission. In this embodiment, one clock synchronization channel or one clock synchronization PDU carries multiple pieces of TSN clock information.

At step S1803, the base station broadcasts the received TSN clock information to a UE.

Figure 19:
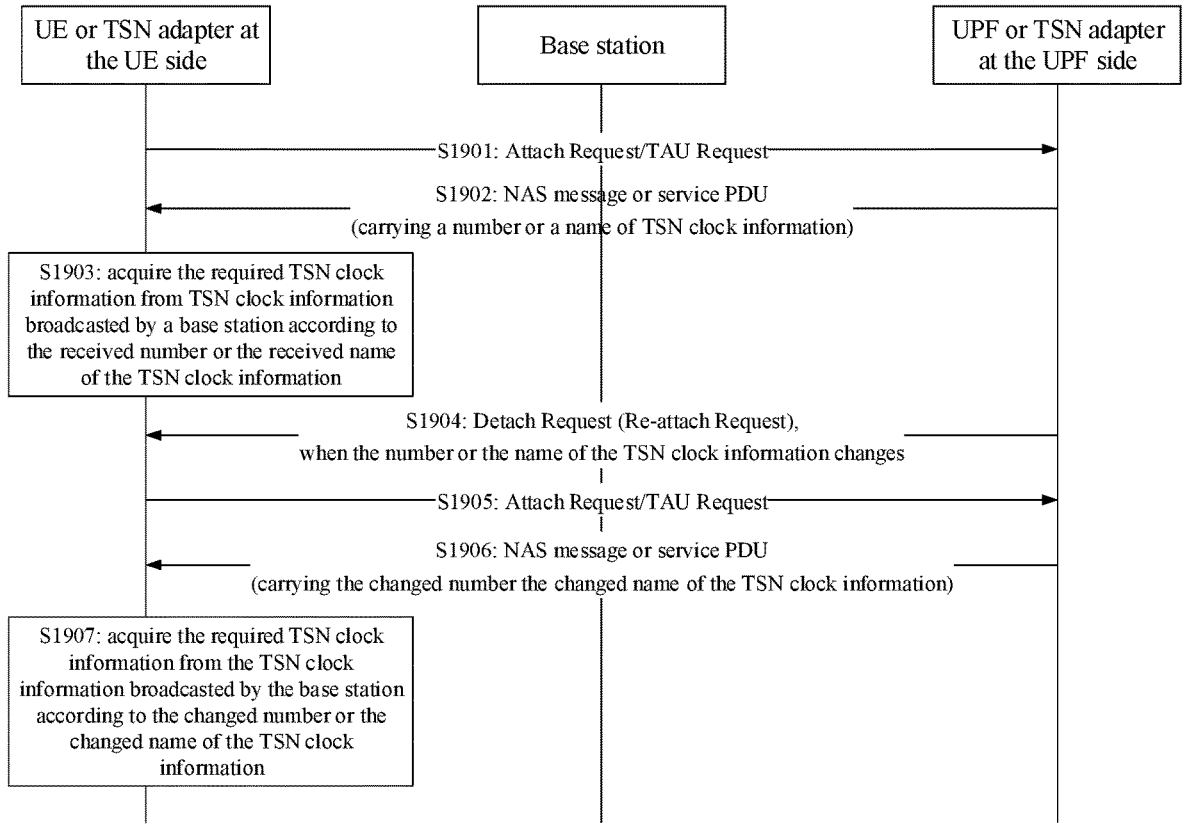
FIG. 19 is a schematic diagram of a process of receiving TSN clock information by a UE according to an embodiment of the present disclosure.

Thus, the UE can select required TSN clock information from the information broadcast by the base station according to a number or a name of the required TSN clock information Embodiment Twelve FIG. 19 is a schematic diagram of a process of receiving TSN clock information by a UE according to an embodiment of the present disclosure, the process includes steps S1901 to S1907.

At step S1901, a UE or a TSN adapter at a UE side sends an Attach Request message or a Tracking Area Update Request (TAU Request) message to a UPF or a TSN adapter at a UPF side.

At step S1902, the UPF or the TSN adapter at the UPF side feeds back an NAS message or a service PDU to the UE or the TSN adapter at the UE side, and the NAS message or the service PDU carries a number or a name of TSN clock information required by the UE or the TSN adapter at the UE side.

The NAS message may be an Attach Accept message, a TAU Accept message or other downlink NAS message.

The service PDU may be an NAS PDU or a predefined data PDU.

At step S1903, the UE or the TSN adapter at the UE side acquires the required TSN clock information from TSN clock information broadcasted by a base station according to the received number or the received name of the TSN clock information. An acquisition way may be selecting the required TSN clock information from the information broadcasted by the base station; or receiving all the information broadcasted by the base station, and then selecting the required TSN clock information from the received information.

Subsequently, if the number or the name of the TSN clock information changes, the UE or the TSN adapter at the UE side receives a number or a name of the required TSN clock information again, and acquires the required TSN clock information again from the TSN clock information broadcasted by the base station again according to the number or the name of the required TSN clock information, which specifically includes the following steps S1904 to S1907.

At step S1904, when the number or the name of the TSN clock information changes, the UPF or the TSN adapter at the UPF side sends Detach Request signaling to the UE or the TSN adapter at the UE side, and a detach type of the Detach Request signaling is Re-attach Required.

At step S1905, the UE or the TSN adapter at the UE side sends an Attach Request message or a TAU Request message to the UPF or the TSN adapter at the UPF side.

At step S1906, the UPF or the TSN adapter at the UPF side feeds back an NAS message or a service PDU to the UE or the TSN adapter at the UE side, and the NAS message or the service PDU carries the changed number or the changed name of the TSN clock information required by the UE or the TSN adapter at the UE side.

The specific form of the NAS message or the service PDU is the same as that described at step S1902, and thus is not repeated here.

At step S1907, the UE or the TSN adapter at the UE side acquires the required TSN clock information from the TSN clock information broadcasted by the base station according to the changed number or the changed name of the TSN clock information that is received. The specific acquisition way is the same as that described at step S1903, and thus is not repeated here.

By adopting the ways described in the above embodiment, the UE or the TSN adapter at the UE side can acquire the required TSN clock information from the TSN clock information broadcasted by the base station according to the number or the name of the required TSN clock information.

In communication networks, some services are sensitive in delay and thus usually require a delay at microsecond level. Since the transmission delay in a communication system is unavoidable, in order to ensure that a data packet can arrive at a destination end on time, a transmission delay of a service needs to be considered when a sending end sends the data packet. Therefore, the sending end may send the data packet in advance to ensure that a moment obtained by adding a sending moment to a predicted transmission delay is earlier than a moment when the destination end expects to receive the data packet. If a moment when the destination end actually receives the data packet is earlier than the expected moment because an actual transmission delay is shorter than the predicted transmission delay, the destination end may buffer the data packet, and then respond to or forward the data packet until the expected moment.

Under the influences of cell coverage, subcarrier spacing of wireless transmission, a transmission type of a backbone network (wired transmission between a gNB and a core network) and network architecture, transmission delays of services in a 5G (the 5$^{th}$ Generation Wireless Systems) network vary greatly, and values of the transmission delays may be at microsecond level or millisecond level. The above factor of network architecture may refer to whether a Centralized Unit (CU) is separated from a Distributed Unit (DU).

Figure 20:
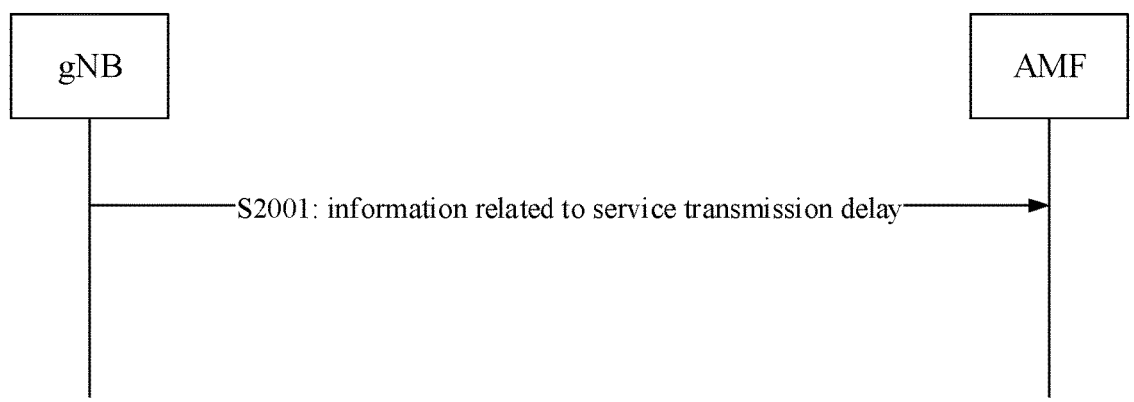
FIG. 20 is a flowchart illustrating a method of sending information related to service transmission delay according to an embodiment of the present disclosure.

In view of the above, an embodiment of the present disclosure further provides a method of sending information related to service transmission delay. As shown in FIG. 20 which is a flowchart illustrating the method, the method includes step S2001.

At step S2001, information related to service transmission delay is transmitted by a base station (such as a gNB) to an AMF through common signaling on an Ng interface or UE-level dedicated signaling on the Ng interface.

According to the information related to the service transmission delay, the AMF can predict a transmission delay of a service, or determine a sending moment of a service data packet.

In one embodiment, the information related to the service transmission delay includes one of the following information: the maximum coverage of a cell, a distance between a UE and the base station, subcarrier spacing of wireless transmission, a transmission type of a backbone network (wired transmission between a gNB and a core network), information about whether a CU is separated from a DU, a predicted transmission delay between the UE and the AMF, a predicted transmission delay between the UE and the gNB, and a predicted transmission delay between the gNB and the AMF.

Figure 21:
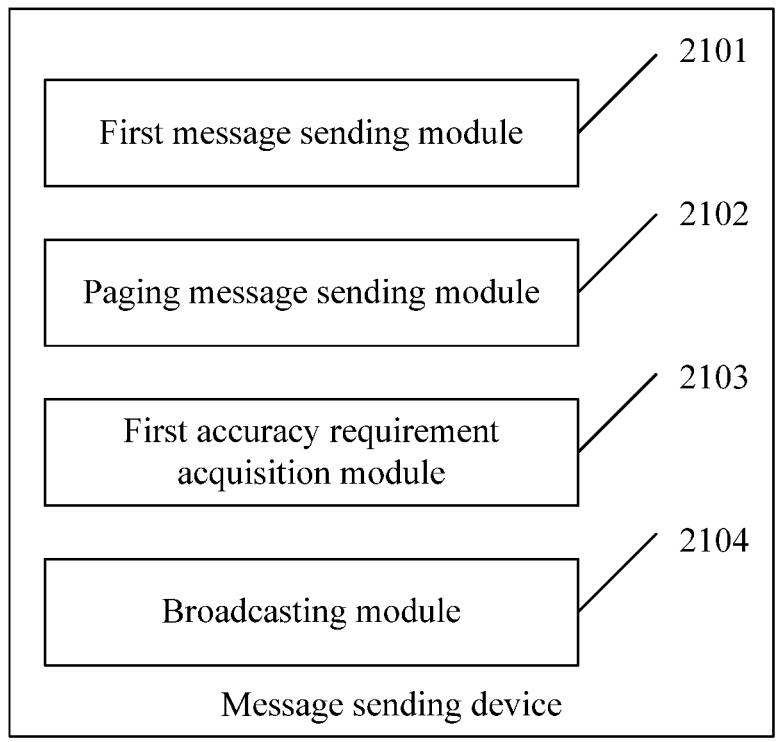
FIG. 21 is a schematic structural diagram of a message sending device according to an embodiment of the present disclosure.

An embodiment of the present disclosure further provides a message sending device. As shown in FIG. 21 which is a schematic structural diagram of a message sending device according to an embodiment of the present disclosure, the device includes a first message sending module 2101.

The first message sending module 2101 is configured to send a first message, which carries at least one of clock information and clock accuracy of a cell, to a UE.

The clock accuracy includes at least one of minimum granularity of clock synchronization, a total number of invalid bits of clock synchronization cell, and indication information which indicates whether to support precise clock synchronization.

As shown in FIG. 21, in an exemplary implementation, the device further includes a Paging message sending module 2102.

The Paging message sending module 2102 is configured to send a Paging message, which carries a clock accuracy requirement of a service, to the UE.

In an exemplary implementation, the first message sent by the first message sending module is a Paging message, which further carries the clock accuracy requirement of the service.

As shown in FIG. 21, in an exemplary implementation, the device further includes a first accuracy requirement acquisition module 2103.

The first accuracy requirement acquisition module 2103 is configured to acquire the clock accuracy requirement of the service, which includes at least one of a required clock accuracy value and an indication as to whether a precise clock is required.

As shown in FIG. 21, in an exemplary implementation, the device further includes a broadcasting module 2104.

The broadcasting module 2104 is configured to broadcast TSN clock information, which carries numbers or names of TSN clock information.

Figure 22:
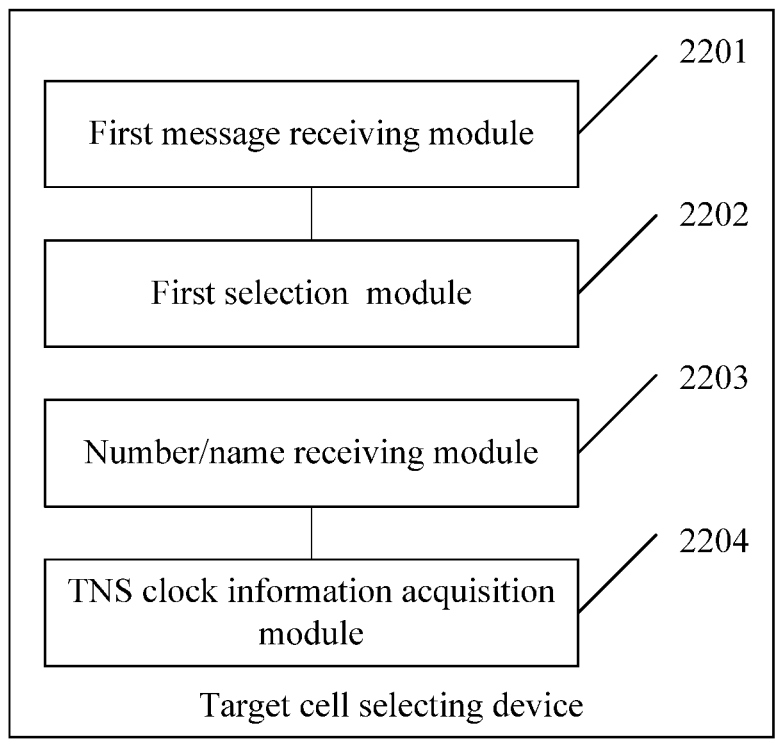
FIG. 22 is a schematic structural diagram of a target cell selecting device according to an embodiment of the present disclosure.

An embodiment of the present disclosure further provides a target cell selecting device. As shown in FIG. 22 which is a schematic structural diagram of a target cell selecting device according to an embodiment of the present disclosure, the device includes a first message receiving module 2201 and a first selection module 2202.

The first message receiving module 2201 is configured to receive a first message which carries at least one of clock information and clock accuracy of a cell. The clock accuracy includes at least one of minimum granularity of clock synchronization, a total number of invalid bits of clock synchronization cell, and indication information which indicates whether to support precise clock synchronization.

The first selection module 2202 is configured to select a target cell according to a clock accuracy requirement of a service and the content carried in the first message.

In an exemplary implementation, the first selection module 2202 is configured to regard a cell as being in a block access state in response to a case where clock information of the cell cannot be acquired or clock accuracy of the cell cannot satisfy the clock accuracy requirement of the service.

In an exemplary implementation, the first selection module 2202 is configured to decrease reselection priority of a cell in response to a case where clock information of the cell cannot be acquired or clock accuracy of the cell cannot satisfy the clock accuracy requirement of the service.

Decreasing the reselection priority of the cell is that: decreasing absolute priority of the cell during a cell selection process or a cell reselection process, subtracting a positive reselection offset from a measured value of the cell, or adding a negative reselection offset to the measured value of the cell.

As shown in FIG. 22, in an exemplary implementation, the device further includes a number/name receiving module 2203 and a TSN clock information acquisition module 2204.

The number/name receiving module 2203 is configured to receive a number or a name of TSN clock information required by a UE or a TSN adapter at a UE side.

The TSN clock information acquisition module 2204 is configured to acquire the TSN clock information required by the UE or the TSN adapter at the UE side from TSN clock information broadcasted by a base station according to the number or the name received.

Figure 23:
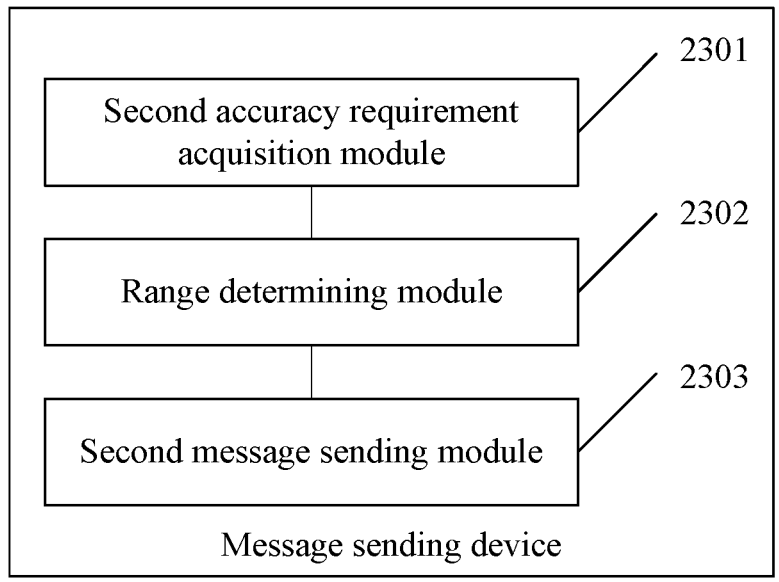
FIG. 23 is a schematic structural diagram of the other message sending device according to an embodiment of the present disclosure.

An embodiment of the present disclosure further provides the other message sending device. As shown in FIG. 23 which is a schematic structural diagram of the other message sending device according to an embodiment of the present disclosure, the device includes a second accuracy requirement acquisition module 2301, a range determining module 2302 and a second message sending module 2303.

The second accuracy requirement acquisition module 2301 is configured to acquire a clock accuracy requirement of a service.

The range determining module 2302 is configured to determine information about a cell range to be measured by a UE according to clock accuracy of a cell and the clock accuracy requirement of the service.

The second message sending module 2303 is configured to send a second message, which carries the information about the cell range to be measured by the UE or clock information of the cell, to the UE.

In an exemplary implementation, the second accuracy requirement acquisition module 2301 is configured to acquire the clock accuracy requirement of the service through UE dedicated signaling, or receive the clock accuracy requirement of the service reported by the UE.

The clock accuracy requirement of the service includes at least one of a required clock accuracy value and an indication as to whether a precise clock is required.

Figure 24:
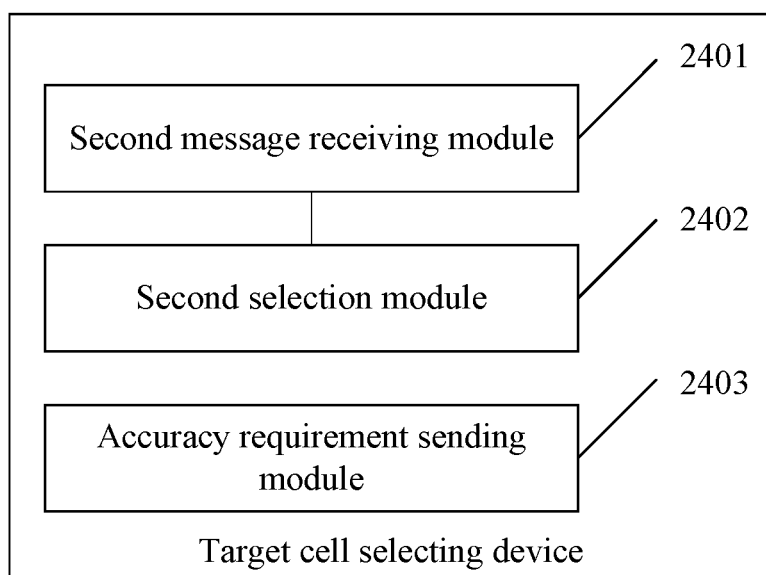
FIG. 24 is a schematic structural diagram of the other target cell selecting device according to an embodiment of the present disclosure.

An embodiment of the present disclosure further provides the other target cell selecting device. As shown in FIG. 24 which is a schematic structural diagram of the other target cell selecting device according to an embodiment of the present disclosure, the device includes a second message receiving module 2401 and a second selection module 2402.

The second message receiving module 2401 is configured to receive a second message, which carries information about a cell range to be measured by a UE or clock information of a cell.

The second selection module 2402 is configured to select a target cell according to the information about the cell range to be measured by the UE.

As shown in FIG. 24, in an exemplary implementation, the device further includes an accuracy requirement sending module 2403.

The accuracy requirement sending module 2403 is configured to send a clock accuracy requirement of a service through UE dedicated signaling or an MAC CE.

The clock accuracy requirement of the service includes at least one of a required clock accuracy value and an indication as to whether a precise clock is required.

The functions of the modules in the device in each embodiment of the present disclosure can be found in the above corresponding description of the methods, and thus are not repeated here.

Figure 25:
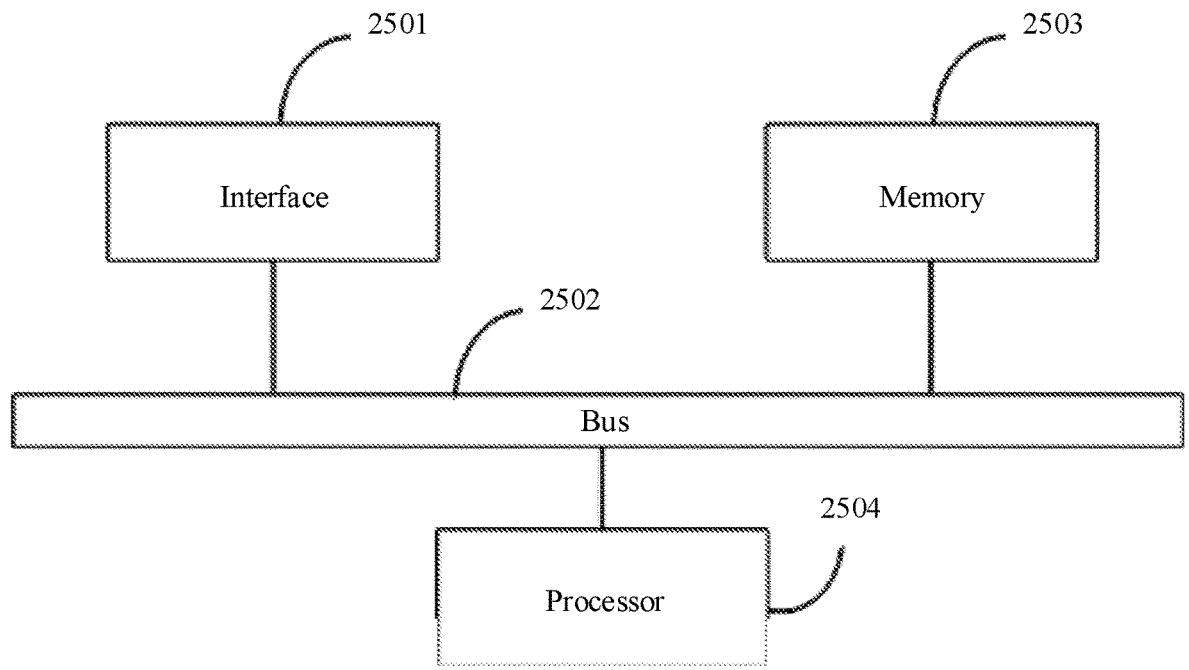
FIG. 25 is a schematic structural diagram of a base station configured to send a message according to an embodiment of the present disclosure.

FIG. 25 is a schematic structural diagram of a base station configured to send a message according to an embodiment of the present disclosure. As shown in FIG. 25, a base station 250 provided by the embodiment of the present disclosure includes a memory 2503 and a processor 2504. The base station 250 may further include an interface 2501 and a bus 2502. The interface 2501 and the memory 2503 are connected to the processor 2504 via the bus 2502. The memory 2503 is configured to store instructions. The processor 2504 is configured to read the instructions to implement the technical solutions in the above embodiments of the message sending methods, and the implementation principles and the technical effects here are similar to what are described above and thus are not repeated here.

Figure 26:
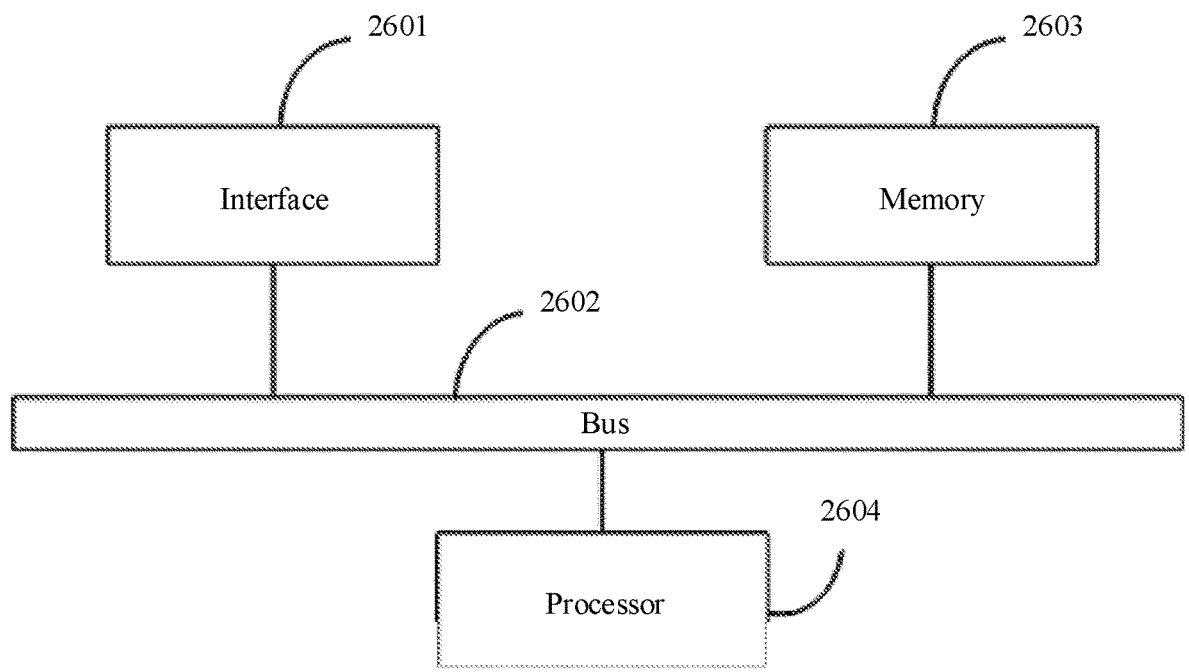
FIG. 26 is a schematic structural diagram of a UE configured to select a target cell according to an embodiment of the present disclosure.

FIG. 26 is a schematic structural diagram of a UE configured to select a target cell according to an embodiment of the present disclosure. As shown in FIG. 26, a UE 260 provided by the embodiment of the present disclosure includes a memory 2603 and a processor 2604. The UE 260 may further include an interface 2601 and a bus 2602. The interface 2601 and the memory 2603 are connected to the processor 2604 via the bus 2602. The memory 2603 is configured to store instructions. The processor 2604 is configured to read the instructions to implement the technical solutions in the above embodiments of the target cell selecting methods, and the implementation principles and the technical effects here are similar to what are described above and thus are not repeated here.

Figure 27:
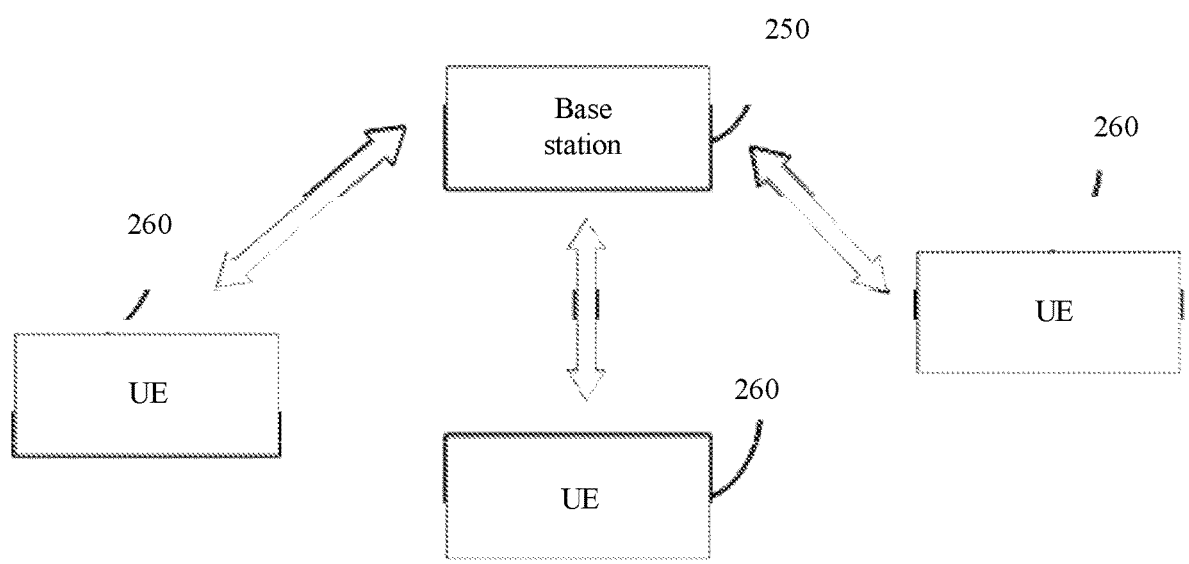
FIG. 27 is a schematic structural diagram of a communication system according to an embodiment of the present disclosure.

FIG. 27 is a schematic structural diagram of a communication system according to an embodiment of the present disclosure. As shown in FIG. 27, the system includes a base station 250 and UEs 260.

The present disclosure further provides a storage medium having a computer program stored therein. When the computer program is executed by a processor, the methods in the above embodiments are implemented.

The above description is only of the exemplary embodiments of the present disclosure, and is not intended to limit the scope of the present disclosure.

It should be understood by those of ordinary skill in the art that the term "UE" indicates any wireless user equipment of a suitable type, such as a mobile phone, a portable data processing device, a portable web browser or a vehicle mobile station.

In general, the various embodiments of the present disclosure may be implemented by hardware or special circuits, software, logic or any combination thereof. For example, some aspects of the present disclosure may be implemented by hardware and other aspects may be implemented by firmware or software executable by a controller, a microprocessor or other computing device, but the present disclosure is not limited thereto.

The embodiments of the present disclosure may be implemented by a data processor of a mobile device executing computer program instructions. For example, the embodiments of the present disclosure are implemented in a processor entity, or by hardware, or by a combination of software and hardware. The computer program instructions may be assembly instructions, Instruction Set Architecture (ISA) instructions, machine instructions, machine-related instructions, microcode, firmware instructions, state setting data, or source code or object code written in one programming language or in any combination of a plurality of programming languages.

A block diagram illustrating any logic flow in the drawings of the present disclosure may show steps of a program, or interconnected logic circuits, modules and functions, or a combination of the steps of the program and the logic circuits, modules and functions. The computer program can be stored on the memory. The memory may be of any type suitable to local technical environment and may be implemented using any suitable data storage technology. The memory in the embodiments of the present disclosure may be a volatile memory or a nonvolatile memory, or may include both a volatile memory and a nonvolatile memory. The nonvolatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM) serving as an external cache. The RAM may include various forms of RAMs, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). The memory in the systems and the methods described herein includes, but is not limited to, the above memories and any other suitable types of memories.

The processor in the embodiments of the present disclosure may be of any type suitable to the local technical environment. For example, the processor is, but not limited to, a general purpose computer, a special purpose computer, a microprocessor, a Digital Signal Processors (DSP), an Application Specific Integrated Circuit (ASIC), a Field Programmable Gate Array (FGPA) or other programmable logic device, a discrete gate or a transistor logic device, a discrete hardware component, or a processor based on multi-core architecture. The general purpose processor may be a microprocessor or a conventional processor. The above processor can implement or perform the steps of the methods disclosed in the embodiments of the present disclosure. A software module may be located in a conventional storage medium in the art, such as an RAM, a flash memory, an ROM, a PROM, an EEPROM or a register. The storage medium is located in the memory, and the processor reads information from the memory and performs the steps of the above methods together with the hardware of the processor.

The exemplary embodiments of the present disclosure are illustrated in detail above by exemplary and non-limiting examples. For those of ordinary skill in the art, various modifications and adjustments to the above embodiments can be obviously derived from the accompanying drawings and the appended claims, but those modifications and adjustments are not beyond the scope of the present disclosure. Therefore, the proper scope of the present disclosure is defined by the appended claims.

What is claimed is:

1. A message sending method performed by a base station, comprising: acquiring a clock accuracy requirement of a service carried by a User Equipment (UE), wherein the clock accuracy requirement of the service carried by the UE comprises at least one of a required clock accuracy value and an indication as to whether a precise clock is required; and sending a first message, which carries the clock accuracy requirement of the service carried by the UE and at least one of clock information and clock accuracy of a cell, to the UE, wherein the clock accuracy comprises a minimum granularity of clock synchronization, wherein the first message is a Radio Resource Control (RRC) connection reject message or an RRC connection release message, and the RRC connection reject message or the RRC connection release message further carries at least one of indication information for decreasing the UE from reselecting a current cell and validity duration of the indication information, wherein the indication information for decreasing the UE from reselecting the current cell is at least more than one of: an indication to decrease reselection priority of the current cell; an indication to add a reselection offset to the current cell; an indication to regard a state of the current cell as a block access state; and information about an RRC connection rejection cause, wherein the RRC connection rejection cause is that the clock accuracy cannot be satisfied or the Quality of Service (QoS) cannot be satisfied.

2. The method of claim 1, further comprising:
broadcasting Time Sensitive Networking (TSN) clock information, which carries numbers or names of TSN clock information, to the UE.

3. A base station configured to send a message, comprising a processor and a memory, wherein
the memory is configured to store instructions; and
the processor is configured to read the instructions to perform the method of claim 1.

4. A non-transitory storage medium having a computer program stored therein, wherein when computer program is executed by a processor, the method of claim 1 is implemented.

5. A target cell selecting method performed by a User Equipment (UE), comprising:
receiving, from a base station, a first message which carries a clock accuracy requirement of the service carried by the UE and at least one of clock information and clock accuracy of a cell, wherein the clock accuracy requirement of the service carried by the UE comprises at least one of a required clock accuracy value and an indication as to whether a precise clock is required, the clock accuracy comprises at least one of minimum granularity of clock synchronization, a total number of invalid bits of clock synchronization cell, and indication information which indicates whether to support precise clock synchronization; and
selecting a target cell according to the clock accuracy requirement of the service carried by the UE and the content carried in the first message,
wherein the step of selecting the target cell according to the clock accuracy requirement of the service and the content carried in the first message comprises:
decreasing reselection priority of a cell in response to a case where clock information of the cell cannot be acquired or clock accuracy of the cell cannot satisfy the clock accuracy requirement of the service,
wherein decreasing the reselection priority of the cell comprises one of:
decreasing absolute priority of the cell during a cell selection process or a cell reselection process;
subtracting a positive reselection offset from a measured value of the cell; or
adding a negative reselection offset to the measured value of the cell.

6. The method of claim 5, wherein the step of selecting the target cell according to the clock accuracy requirement of the service and the content carried in the first message further comprises:
regarding a cell as being in a block access state in response to a case where clock information of the cell cannot be acquired or clock accuracy of the cell cannot satisfy the clock accuracy requirement of the service.

7. The method of claim 5, further comprising:
receiving a number or a name of TSN clock information required by a UE or a TSN adapter at a UE side; and
acquiring, according to the number or the name, the TSN clock information required by the UE or the TSN adapter at the UE side from TSN clock information broadcasted by a base station.

8. A UE configured to select a target cell, comprising a processor and a memory, wherein
the memory is configured to store instructions; and
the processor is configured to read the instructions to perform the method of claim 5.

9. A non-transitory storage medium having a computer program stored therein, wherein when computer program is executed by a processor, the method of claim 5 is implemented.

10. A message sending method performed by a base station, comprising:
acquiring a clock accuracy requirement of a service carried by a UE, wherein the clock accuracy requirement of the service carried by the UE comprises at least one of a required clock accuracy value and an indication as to whether a precise clock is required;
determining information about a cell range to be measured by the UE satisfying the clock accuracy requirement of the service carried by the UE according to clock accuracy of a cell and the clock accuracy requirement of the service carried by the UE; and
sending a second message, which carries the information about the cell range to be measured by the UE or clock information of the cell, to the UE,
wherein the second message is a Paging message or UE dedicated signaling,
in response to the second message being the Paging message, the information about the cell range to be measured by the UE comprises at least one of target cell information and an indication to reselect a target cell; and
in response to the second message being UE dedicated signaling, the information about the cell range to be measured by the UE comprises at least one of a blacklist of cells, a whitelist of cells, and a predetermined cell list which comprises an identification of a neighboring cell that satisfies the clock accuracy requirement of the service.

11. The method of claim 10, wherein the step of acquiring the clock accuracy requirement of the service comprises:
   acquiring the clock accuracy requirement of the service through UE dedicated signaling; or
   receiving the clock accuracy requirement of the service reported by the UE,
   wherein the clock accuracy requirement of the service comprises at least one of a required clock accuracy value and an indication as to whether a precise clock is required.

12. A base station configured to send a message, comprising a processor and a memory, wherein
   the memory is configured to store instructions; and
   the processor is configured to read the instructions to perform the method of claim 10.

13. A non-transitory storage medium having a computer program stored therein, wherein when computer program is executed by a processor, the method of claim 10 is implemented.

* * * * *